United States Patent [19]

Ekstrom et al.

[11] Patent Number: 5,675,147
[45] Date of Patent: Oct. 7, 1997

[54] SYSTEM AND METHOD OF PETROPHYSICAL FORMATION EVALUATION IN HETEROGENEOUS FORMATIONS

[75] Inventors: Michael P. Ekstrom, Austin, Tex.;
David J. Rossi, Newtown, Conn.;
Orhan Arikan, Ankara, Turkey

[73] Assignee: Schlumberger Technology Corporation, Austin, Tex.

[21] Appl. No.: 589,320

[22] Filed: Jan. 22, 1996

[51] Int. Cl.$^6$ ............................................. G01V 5/04
[52] U.S. Cl. ...................... 250/256; 250/261; 364/422
[58] Field of Search .............................. 250/254, 256, 250/261; 364/422

[56] References Cited

U.S. PATENT DOCUMENTS

| 4,313,164 | 1/1982 | Regat | 364/422 |
|---|---|---|---|
| 4,314,338 | 2/1982 | Suau et al. | 364/422 |
| 5,334,833 | 8/1994 | Case et al. | 250/270 |

OTHER PUBLICATIONS

J. Quirein, S. Kimminau, J. La Vigne, J. Singer, and F. Wendel, A Coherent Framework for Developing and Applying Multiple Formation Evaluation Models, paper DD, published at SPWLA 27th Annual Logging Symposium, Houston, Texas, Jun. 9–13, 1986.

Q.-H. Liu, Reconstruction of Two–Dimensional Axisymmetric Inhomogeneous Media, Schlumberger–Doll Research Note Report #ISD–005 92 48, Aug. 17, 1992, published at IEEE Transactions on Geoscience and Remote Sensing, vol. 31, No. 3, pp. 587–594, May 1993.

Q.-H. Liu, Nonlinear Inversion of Electrode–Type Resistivity Measurements, Schlumberger–Doll Research Note Report #ISD–006–93–48, Jun. 25, 1993, published at IEEE Transactions on Geoscience and Remote Sensing, vol. 32, No. 3, pp. 499–507, May 1994.

*Primary Examiner*—David P. Porta
*Assistant Examiner*—David Vernon Bruce
*Attorney, Agent, or Firm*—Charles D. Huston; Danita J. M. Maseles

[57] ABSTRACT

A system and method for evaluating a geological formation is described which compares actual wireline log measurements from a number of wireline logging tools to predicted tool response logs. The system and method uses a forward model of each tool response, given a formation description, to predict a set of wireline logs. Comparing the predicted logs with the actual measured logs yields a mismatch error. The system and method iteratively adjusts the formation description to minimize the mismatch error to obtain a "best" formation description. In one form, the formation description includes petrophysical properties (porosity, density, saturation) and geometry properties (dip, bedding, invasion). In a more complicated form, the formation description also includes a model of petrophysical mixing laws and formation material content. In the special case of a horizontally layered formation and linear tool response models, there exists a computationally efficient version of the system and method.

26 Claims, 12 Drawing Sheets

SYSTEM AND METHOD OF PETROPHYSICAL FORMATION EVALUATION IN HETEROGENEOUS FORMATIONS

FIELD OF THE INVENTION

This invention relates to the field of wireline logging and logging-while-drilling (LWD) and interpretation, and in particular, relates to a system and method for interpreting geological formations comparing a multiplicity of actual log measurements with log measurements predicted using computational tool response models. A specific embodiment relates to a system and method for determining bed boundaries and associated bedding formation properties in a horizontally stratified geological formation.

BACKGROUND OF THE INVENTION

An oil & gas company, after drilling a well borehole, is particularly interested in the subsurface geological formations surrounding the well borehole. The oil & gas company would like to understand the geological formation to determine if the formation contains hydrocarbon resources (oil and/or gas), the amount and producibility of hydrocarbon the formation contains, and the best options for completing the well, as well as anticipate any problems that might be encountered during completion and production. A significant aid in this evaluation is the use of wireline logging and/or LWD measurements of the formation surrounding the borehole (sometimes referred to herein collectively as "logs" or "log measurements"). Typically, one or more logging tools are lowered into the borehole and the tool readings or "measurement logs" are recorded as the tools traverse the borehole. These measurement logs are used to infer the desired formation properties.

In evaluating the hydrocarbon production potential of a subsurface formation, the formation under study is described in terms of a set of "petrophysical properties." The petrophysical properties include (1) the lithology or the rock type, e.g. amount of sand, shale, limestone, or more detailed mineralogical description, (2) the porosity or fraction of the rock that is void or pore space, and (3) the fluid saturations or fractions of the pore space occupied by oil, water and gas. Wireline logging tools do not directly measure petrophysical properties, they measure "log properties", for example, bulk density, electrical resistivity and acoustic velocity. Log properties are related to petrophysical properties via a set of mathematical or statistical relations called "petrophysical mixing relations." In formation evaluation, a set of wireline logs are interpreted or processed, using knowledge of petrophysical mixing relations, to estimate the formation petrophysical properties such as porosity, saturation and lithology.

As no single physical measurement provides all the information needed to evaluate hydrocarbon production potential, many different types of tools have been developed for providing information regarding the petrophysical properties of a formation. See, e.g. U.S. Pat. Nos. 4,780,679, 4,722,220, 4,703,277, 4,646,240, 4,597,290, 4,531,188, 4,939,648, 5,355,088, and 5,350,925 (incorporated by reference). Typically, in a logging operation, several different logging tools are combined and used simultaneously to obtain an integrated set of measurements which are used to obtain the desired formation information. In this context, different tools may, in fact, be used to obtain information about the same set of formation properties using different techniques, or different tools may be used to obtain information about different formation properties. Due to differences in physical measurement modalities and sensor configurations, different logging tools have different volumes or zones of investigation, hence different measurement resolutions. For example, a sonic tool may look at the geological formation around the borehole extending for several meters away from the borehole, but its vertical resolution along the borehole is about a meter. In contrast, the Formation MicroScanner™ tool has a vertical resolution of several millimeters, but its depth of investigation is correspondingly small.

Subsurface formations are generally heterogeneous, so that porosity, saturation and lithology vary with position. Examples of heterogeneity include the presence of geological beds and the result of migration or invasion of a bank of borehole fluid into the formation. Because each logging tool has a nonzero volume of investigation, more than one heterogeneous region (for example, multiple beds) may lie within the volume of investigation of a tool. Consequently, as different logging tools have different volumes of investigation, in processing the logs from multiple tools during formation evaluation, the effect of formation heterogeneity must be corrected to avoid erroneous results. Otherwise, for example, the petrophysical evaluation of one region may be interfered and distorted by the presence of another region of heterogeneity lying within the larger volume of investigation of one tool, for example, while not in that of the others.

Prior to performing formation evaluation, the effects of formation heterogeneity are partially accounted for using a series of "corrections". These compensate for certain simplified types of heterogeneity—the presence of the borehole ("borehole correction"), the presence of a single layer ("shoulder correction"), the presence of borehole fluid which has migrated into the formation ("invasion correction") and the presence of a non-horizontal bedding orientation ("dip correction"). Despite the fact that these effects are mutually coupled in the instrumental response of the measurement, each of these corrections assumes that the only type of heterogeneity present is the one being corrected. These corrections comprise a sequence of independent pre-processing steps performed prior to formation evaluation, and during formation evaluation it is implicitly assumed that the formation is homogeneous.

Computational models exist for precisely simulating how a wireline logging or LWD tool responds to a specified heterogeneous formation, a process sometimes referred to as "forward-modeling." However, such forward models are typically of individual tool responses and are primarily used in research for designing tools. Use of forward model tool responses for formation evaluation has been limited or nonexistent. Generally, it would be a significant advance if formation evaluation used tool response forward models to better accommodate multiple logging tools with multiple volumes of investigation for improved petrophysical evaluation in heterogeneous formations.

Another objective and challenge in multiple tool formation evaluation is the ability to depth align or depth match different tools traversing a common depth in the borehole at different times. In the wireline case, due to the elasticity of the cable supporting downhole tools and a nonconstant drag friction along the borehole wall, tools record downhole information at true depths that are different from the "cable depth" reported by the uphole winch. In the LWD case, similar difficulties exist in tool depth alignment due, for example, to the temperature-dependent elasticity of the drilling pipe and length variations in drill pipe segments. For both situations, fine-scale depth alignment of logs from different tools using conventional algorithms fails because all tools have a nonzero resolution and blur the formation with a tool response signature which is characteristic to each tool. It follows that fine-scale registration of logs from multiple tools requires explicit use of tool response models.

A commonly encountered heterogeneous formation is a stack of thin beds. Formation evaluation in thin beds gives rise to the particular problem of identifying the bed or layer geometry (number of beds, their locations, sizes and orientation). Usually, bed boundaries are placed at the estimated inflection points of the acquired logs. Although it is computationally efficient, this approach of estimating bed boundary positions has several important drawbacks: the tool responses are not taken into account, and the inflection point estimates obtained from different types of measurements (e.g. acoustic and nuclear) of the same bedding structure will typically differ and cannot be easily combined. This problem is especially difficult when the logging tools used have a vertical resolution greater than the bed thicknesses, e.g. a vertical tool resolution of 2–3 meters with beds less than 1 meter thick.

In this disclosure, all patent references are incorporated by reference and all non-patent references are incorporated by reference for background.

SUMMARY OF THE INVENTION

The limitations of current formation evaluation techniques outlined above are addressed by the system and method of the present invention which uses a set of measured wireline and/or LWD logs and knowledge of the associated tool response models to estimate the heterogeneous distribution of earth formation properties. For the important particular case of a stack of horizontal beds and linear tool response models, the bed boundaries and the formation properties inside each bed are estimated in a computationally efficient manner.

The predicted logs are computed using a separate forward response model for each tool, but with a common input formation description. The formation description typically includes both a geometrical description of the heterogeneity (how the formation is divided into regions such as beds or invasion zones) as characterized by the set of parameters g and a description of the formation properties within each region (associated with the rock and fluid types present), as characterized by the set of parameters p. There is a hierarchy of geometrical descriptions, depending on the physical complexity of the heterogeneity. As shown in FIG. 1, this hierarchy is based on the formation's geometrical complexity. The "one-dimensional" model corresponds to a formation having a spatial variation only in the depth direction, being composed of a set of beds with otherwise homogeneous characteristics. In this case, the geometrical description g involves the depth locations of the bed boundaries. In the "two-dimensional" case, borehole fluid invasion is introduced into this model, providing spatial variation in the radial direction from the borehole. The geometrical parameters are the bedding boundaries augmented by the invasion boundary location in each bed. Correspondingly, the "three-dimensional" case, involves the full geometric generality, e.g. introducing tilt or dip into the bedding structure, with the attendant parametric representations of the bedding orientation added to the parameter set.

The formation properties in each region of the chosen geometrical model may be represented in a hierarchy of properties models, based on the elemental level of composition of the constitutive rock/fluid components as shown in FIG. 2. At the "macroscopic" level, the model involves a set of so-called log properties, $p_l$ which are those parameters associated with the direct log response, such as bulk density, electrical resistivity and acoustic velocity. A more detailed model involves using a set of the petrophysical properties $p_p$ such as porosity, fluid saturations and lithology, which are related to the log properties through petrophysical mixing laws. For example, using Archie's equation, the electrical resistivity is a function of the water saturation and porosity. At the "atomic" level, the elemental or mineralogical volumes such as the volume quartz, volume dolomite, volume oil etc. comprise the set of model parameters, $p_v$. They are, in turn, related to the petrophysical properties through a forward model or mixing law. Different representations offer different advantages in solving the inverse problem, with the dimensionality of the models along with the statistical independence of the parameter set increasing from the log properties level through the hierarchy.

Generally speaking, the method estimates a formation description by comparing the actual log measurements with a corresponding set of predicted logs. The predicted logs generated from the chosen formation descriptions (g & p) and the tool response models (including mixing laws if appropriate) are compared with the actual measured logs, and a difference error between the predicted and actual logs is determined. An object function or mismatch criterion is defined, which is a prescribed function of this error. It is used to provide a measure of "goodness" of the predictive logs to represent the physical reality of the measured logs. This object function is combined with a constraint function (e.g. upper and lower bounds on the formation description parameters), and an optimization problem is formulated where the formation parameters are chosen to minimize the mismatch criterion, subject to the imposed constraints. Depending on the form of the object function, constraints imposed, and variational knowledge of the forward model, this minimization involves an iterative process whereby the formation parameter estimates are successively refined until the mismatch criterion is reduced to an acceptable level. Because, in general, the computed logs depend nonlinearly on both of the formation geometric and property parameters, the best estimates are obtained using an iterative nonlinear optimization procedure. See P. E. Gill, W. Murray, and M. H. Wright, Practical Optimization, San Diego, Academic Press, 1981.

The preferred method begins by specifying an initial set of formation geometry and property parameters, for example, layer boundaries from the position of log inflection points, or invasion front positions and properties using logs from tools having multiple depths of investigation. Beginning with this initial model, the procedure iteratively estimates the formation geometry and property parameters by comparing a number of actual log measurements with a number of predicted log measurements. The predicted logs are computed using a response model for each tool based on the initial estimate of the formation geometry and properties. The initial predicted logs are compared with the actual log measurements to generate a mismatch criterion or object function that depends on the difference error. A new estimate of the formation geometry and properties is determined by the optimization algorithm employed, so as to reduce the mismatch criterion. This process is iteratively repeated, the final formation representation being chosen as the "best" estimate of the formation geometry and properties when the value of the object function is sufficiently small. Further, the parameters may also be constrained to satisfy auxiliary conditions, for example, to lie within a predetermined range of values, or for a set of values to sum to unity. In this case, a constrained Gauss Newton optimization procedure is used.

In a preferred form, the system and method of the present invention is used in layered formations with one-dimensional linear tool response models, including convolutional models, and a weighted least-squares mismatch criterion. With linear tool response models, if the geometrical bed boundary parameters are specified, the optimum layer property values can be obtained directly without a search process. This leads to an efficient optimization procedure where only the set of geometrical parameters are estimated iteratively, and at each step of the iteration the optimum formation properties are identified noniteratively by matrix inversion. Compared to the more general optimization problem, this leads to searches in lower dimensional parameter spaces, with attendant improvements in computational efficiency and faster solutions.

With layered formations, fine-resolution "ground truth" information reflecting bed boundaries is often available, such as from core or log data from the Formation MicroScanner™ or Formation MicroImager™ (FMS, FMI) imaging services by Schlumberger Technology Corporation. See, M. P. Ekstrom, C. A. Dahan, M. Y. Chen, P. M. Lloyd, and D. J. Rossi, Formation Imaging with Micro Electrical Scanning Arrays, The Log Analyst, 28(3), 294–306, 1987. In this context, fine-resolution implies resolutions which are much better than those of the logging tools used to measure the formation parameters (e.g. vertical resolutions on the centimeter or millimeter scale, rather than meter scale). Such fine-scale information can be introduced into the algorithm in several ways. These data may be introduced into the algorithm as additional weighted, "measured logs." The weight attributed to this type of log must reflect (1) the influence of the disparity of resolution, as the fine-scale logs will resolve many more beds than the conventional logs and not all of these beds may be included in the formation model, and (2) the quality of the fine-scale data, which is sensitive to bad borehole conditions and/or mud conditions. Alternatively, the fine-scale data may be used to establish a bedded or zoned formation model, for example, by using an image edge detection or texture segmentation algorithm to process FMS or FMI imagery. Some or all of the detected beds or zones may be selected for inclusion in the formation model, and this is especially useful in establishing an initial model.

A corollary to the present method is the ability to evaluate the noise sensitivity and contribution of each log measurement to the formation description. For example, the effect of measurement noise can be incorporated into one or more tool response models and the sensitivity of the estimated formation description to the measurement noise determined. This, of course, can help define the quality and accuracy of the estimated formation description and the contribution of each tool to the quality of the estimated formation description. It may also be used to assess the value of additional measurements not yet acquired in the design of future logging programs. It may additionally be used to assess resolution-noise tradeoffs in modeling thinly layered formations. Specifically, the iterative computational method in this invention can be used several times beginning with different initial models, ranging from a thickly bedded model having few layers to a thinly bedded model having a large number of layers (e.g. established from core or an imaging logging tool). By performing noise sensitivity analysis on the resulting estimated formations, the relationship may be established between modeled bed thickness and accuracy of the property estimates. This information serves as a guide to select the minimum acceptable bed thickness in the formation model.

Another corollary to the present method is the ability to depth align or depth match logs from different tools traversing a common depth in the borehole at different times. One method of this invention makes explicit use of tool response models to account for nonzero tool resolution, and introduces auxiliary "depth shift" variables that are estimated during inversion and used for fine-scale registration of logs from multiple tools.

Tool response models are developed and used primarily in research and engineering in support of new tool development. A diversity of tool models exist, and even for a specific tool, several models may be available to compute the response to different types of heterogeneity. For example, several models might be available to compute the response of a tool in formations of varying geometric complexity, such as a vertical stack of layers (one-dimensional model), or a stack of layers with fluid invasion into the various layers (two-dimensional model), or a stack of layers that are dipping at some angle with respect to the borehole (three-dimensional model). Among the simplest tool response models are the linear models, but nonlinear models are required to handle mixing laws and more complicated heterogeneity. This invention makes use of multiple tool response models for each tool, and invokes the tool response model that is most appropriate for the modeling task being performed and the geometric complexity of the heterogeneity. In a preferred embodiment of the algorithm, a hierarchical formation evaluation approach is used, consistent with Tukey's principle of parsimony, which begins with the simplest tool response models, and invokes more complex models as they are needed to obtain data consistency and a suitably small mismatch criterion.

One embodiment invoking increasingly complex models begins with a formation model that is a stack of layers, and assumes linear tool response models to obtain a computationally efficient solution for the bed positions and properties. Because the formation model is assumed to be a stack of layers, the logs are preprocessed as necessary to correct for the presence of the borehole, fluid invasion and formation dip. Although the algorithm is designed under the assumption of a layered formation description, it functions well even with moderate amounts of fluid invasion and layer dip angle. If fluid invasion is present, in one embodiment it can be handled to a first-order approximation by assigning a separate layer parameter to each tool that is sensitive to invasion. For example, each tool with a different depth of investigation may provide its own estimate of layer resistivity, and the different resistivity estimates from different tools may be compared to infer fluid invasion.

If invasion is present beyond some limit, say with highly permeable sands between shale layers, a more complicated two-dimensional layered-invaded formation model is invoked. Not all of the layers will require a description with fluid invasion. For example, impermeable shales do not require additional invasion parameters, and a layer with deep invasion extending beyond the depth of investigation of the available tools does not require additional invasion parameters. Only for those layers which require additional invasion parameters to reconcile the predicted and measured logs, 3, 4 or 5 invasion parameters are introduced: bed positions, invasion radius, and properties in the invaded and uninvaded zones. For computational efficiency with certain tool models, the bed boundary estimation problem may be performed separately from the estimation of the radial invasion boundary and properties.

Alternatively, if bedding dip is present beyond some angular limit, say in highly deviated and horizontal well applications, a more complicated three dimensional formation model of a dipping stack of layers is invoked. In this case, the relative dip angle of the formation to the borehole is assumed to be known from external information such as from the Dipmeter, FMS or FMI imaging services from Schlumberger Technology Corporation, and the dipping tool response models are used for formation evaluation.

The system for interpreting a geological formation of the present invention ideally comprises a specially programmed computer having memory storing a set of actual measurement logs from an oil or gas well borehole in a geological formation of interest. A set of tool response models is also stored in memory where each response model predicts a measurement log based on an input formation description. The specially programmed computer includes a mechanism for inputting or changing the formation description. The processor of this specially programmed computer generates a predicted log based on an input formation description and said tool response model retrieved from memory. The processor operates to compare the predicted logs and the corresponding measurement logs and generates a difference error between the predicted logs and the measurement logs. A display communicates the formation description, and optionally the difference error between the predicted logs and measurement logs, to the interpreter. In the preferred embodiment, the processor operates to iteratively change the formation description, computing a mismatch criterion which includes the contribution of the difference errors and arriving at a formation description corresponding to a minimal mismatch criterion.

DESCRIPTION OF THE PREFERRED EMBODIMENT

I. General Approach

Figure 7:
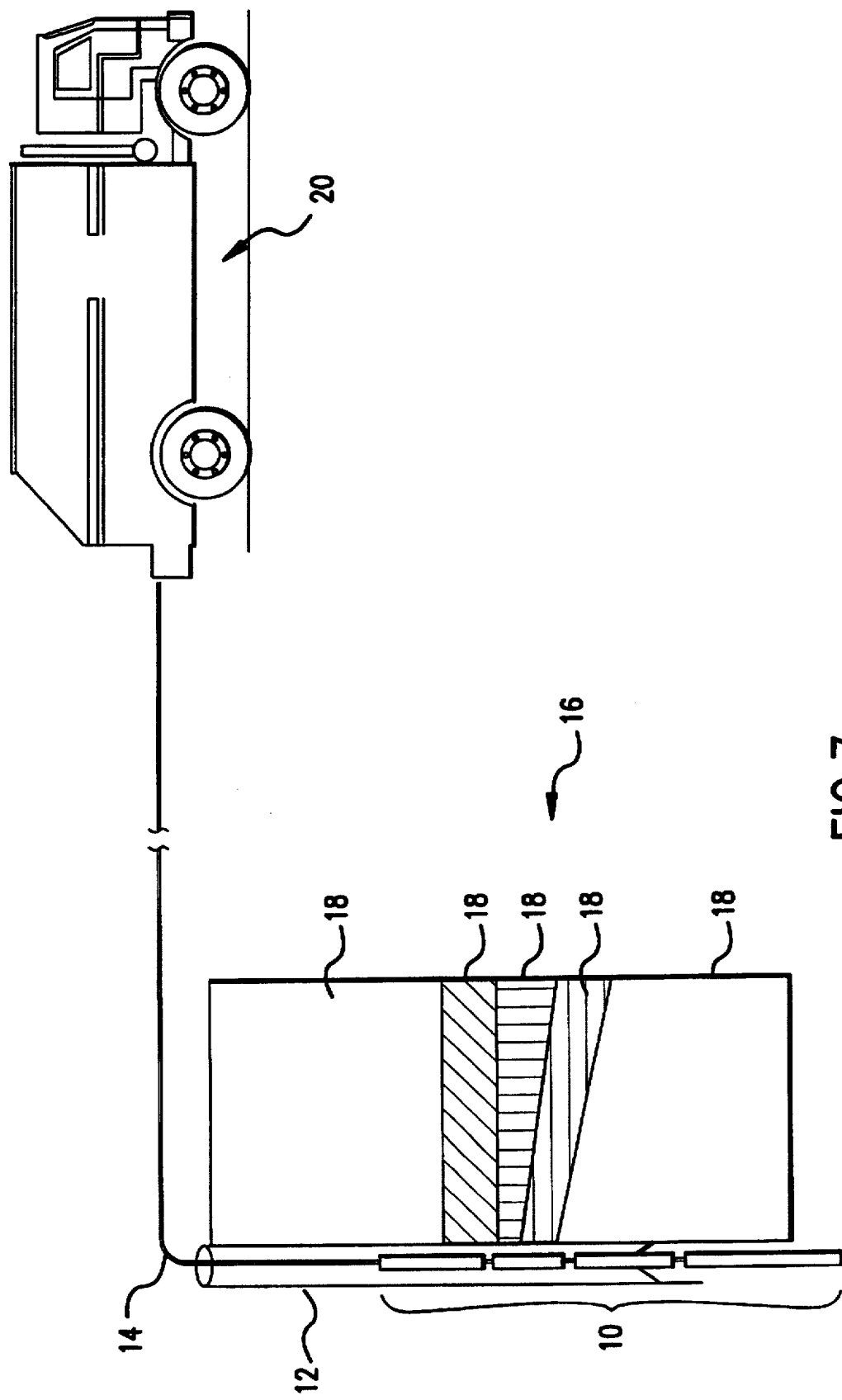
FIG. 7 is a side view of a wireline logging operation of a typical geological formation.

Turning to the drawings, FIG. 7 schematically illustrates a typical wireline logging operation where one or more tools 10 are assembled into a string and lowered into an oilwell 12. Tools 10 may be conveyed on a wireline cable 14, or on the end of drill pipe during logging while drilling (LWD), or in some special types of wells such as horizontal wells, the tools may be conveyed by coiled tubing. The oilwell 12 is bored through a geological formation 16 which in FIG. 7 is a layered formation containing a number of beds or layers 18 of different petrophysical properties. As previously mentioned, a number of different types of tools 10 are available for looking at different aspects of the formation. Measurements of the formation from the tools 10 are conveyed by the cable 14, or with LWD using a retrievable downhole memory or using mud column pulsing, to a computer acquisition system 20, such as residing in the truck shown in FIG. 7. These measurements are typically called "logs" and usually comprise a tool measurement recorded versus distance along the oilwell 12.

Figure 6:
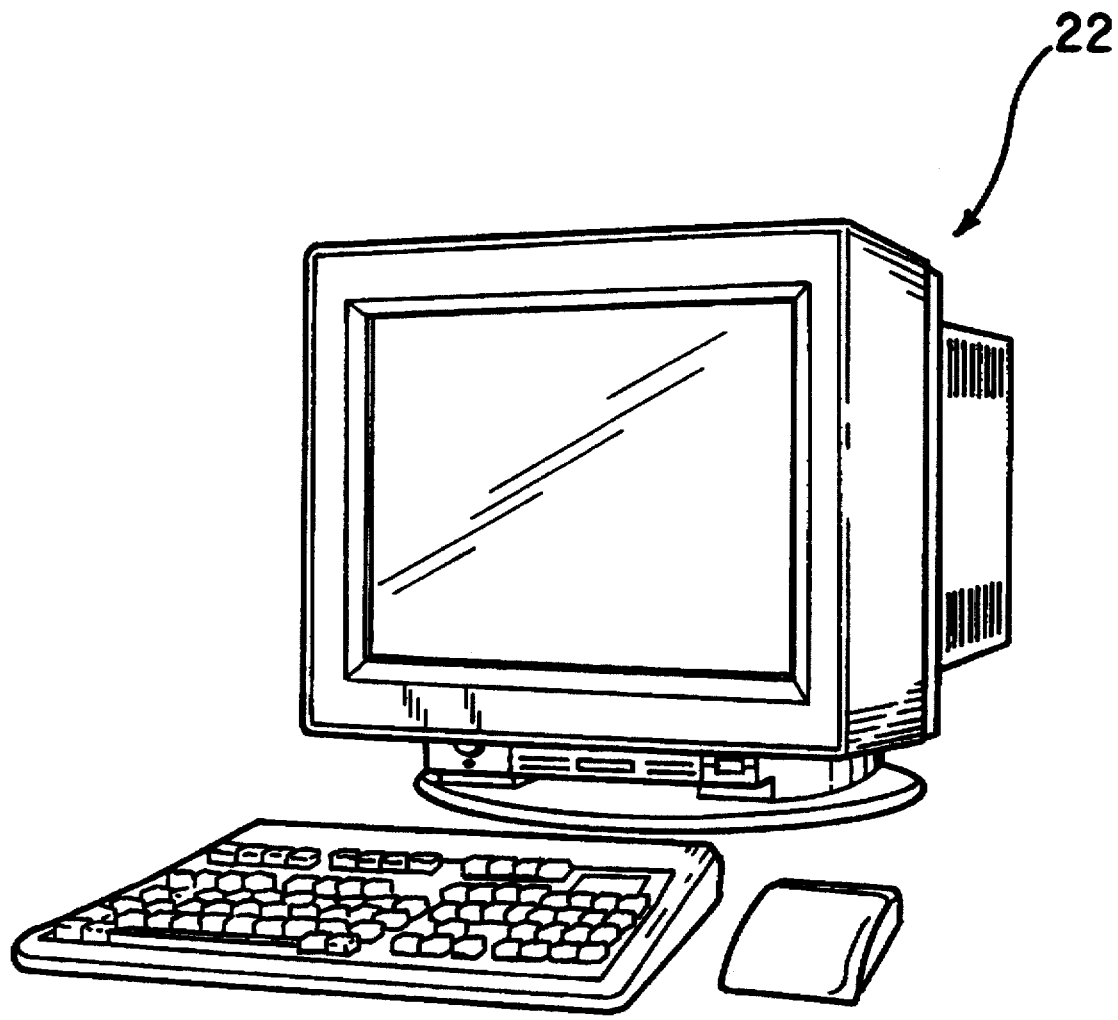
FIG. 6 is an illustration of an interpretation workstation for evaluating geological formation in accordance with the present invention.

FIG. 6 shows a workstation 22 for interpreting the logs or measurements obtained from the acquisition system of FIG. 7. It should be appreciated that the interpretation function of FIG. 6 may actually occur in the acquisition truck 20 during well logging operation or shortly thereafter. Interpretation can occur long after the logging operation in the offices of the oil and gas company.

Log analysis is sometimes called a "geophysical inverse problem". Prediction of the response of a sensor, (e.g. an oilwell logging tool) from a known physical system (e.g. a geological formation) is called a forward modeling problem. Traditional log analysis or formation evaluation defines the physical properties of a geological formation from tool measurements, and is called an inverse problem. While a great deal of research and understanding is available relating to inverse problems, the commonly used processes of estimating a formation description from multiple tool measurements has not incorporated forward tool modeling nor used any process to insure a consistent formation model for multiple tool observations.

Many types of forward modeling codes have been developed and are available for commercial electromagnetic logging tools (e.g. linearized Born approximation for induction tools, numerical mode matching for induction tools in layered, invaded formations, 2D and 3D finite-element models for Laterolog resistivity tools), nuclear logging tools (e.g. 1D and 2D sensitivity functions based on Monte Carlo analysis), and sonic logging tools (e.g. ray tracing, real axis integration and finite-difference). Such forward modeling codes have as input a description of the geological formation and they compute a predicted logging tool response.

Figure 3:
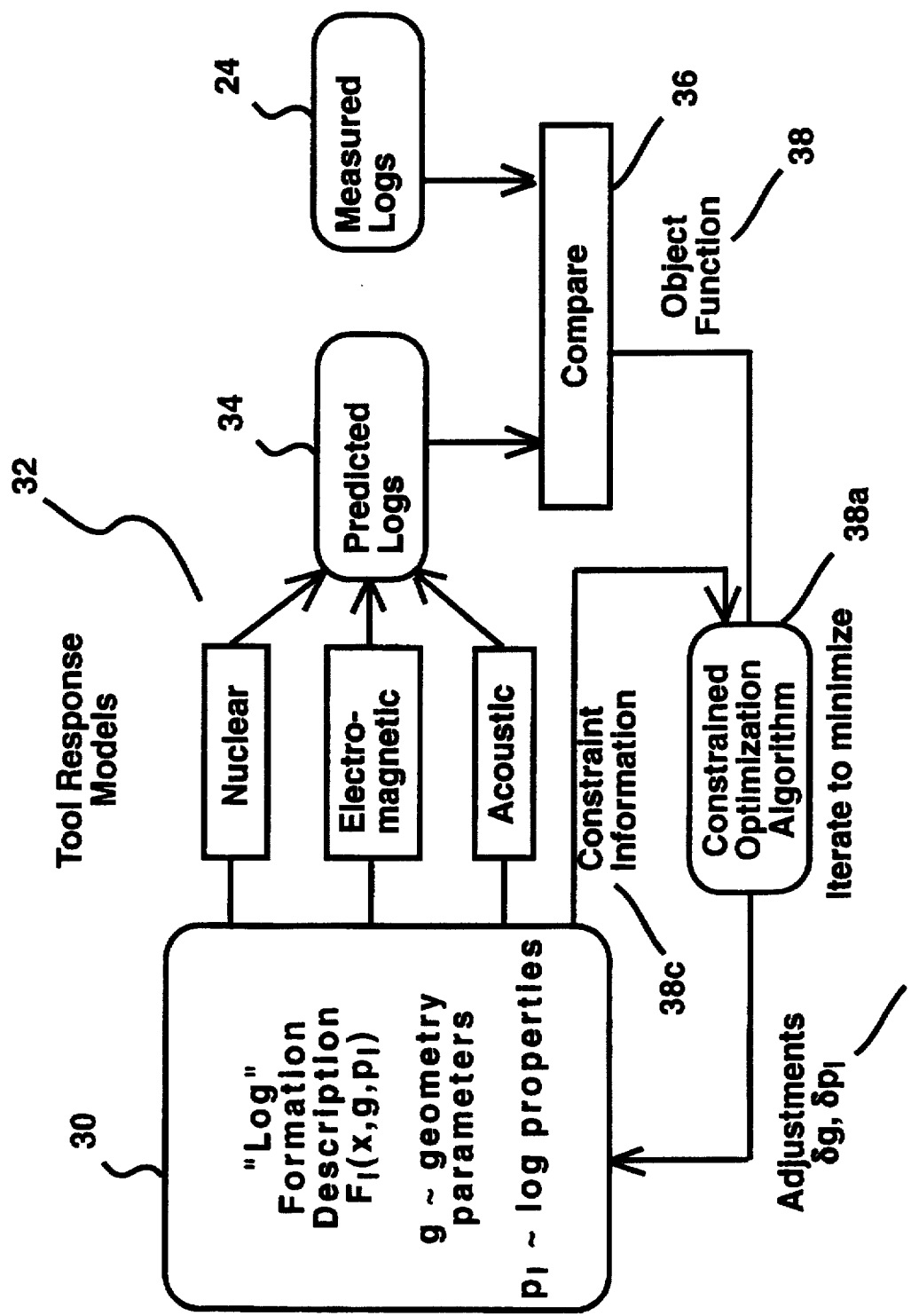
FIG. 3 is a block diagram illustrating the method of the present invention with the formation properties given in terms of "log" parameters.

Turning to FIG. 3, the general operation of the method of the present invention is schematically illustrated. In FIG. 3, a formation description 30 is used as input into one or more tool response forward models 32. Forward models 32 may be constructed for practically any type of logging tool, with nuclear, electromagnetic, and acoustic forward models 32 being shown in FIG. 3. The models chosen should match the tools used to provide the set of measured logs. The tool response forward models 32 output the predicted response from the sensor, that is, a set of predicted logs 34.

The predicted logs 34 are compared with the actual measured logs 24 in a comparison step 36 as denoted in FIG. 3. The measured logs 24 are those obtained from the acquisition process in FIG. 7 and are illustrated in FIG. 6. An object function or mismatch criterion 38 is defined which is a function of the difference error obtained by comparing the predicted logs 34 and the measured logs 24. It is used to indicate the accuracy and consistency of the formation description 30. In the method of the present invention, the object function 38 is combined with constraint information 38c based on the formation description 30. A constrained optimization algorithm 38a is used to compute a correction or adjustment 38b to the formation description 30. The formation description at 30, consisting of both geometry and property parameters, is modified by the adjustment 38b so that the object function 38 is reduced, and the process of comparing the predicted logs 34 with the measured logs 24 iteratively repeated. When the object function 38 attains a minimum, or is below a certain predetermined threshold, the current formation description 30 is used as the estimate of the geological formation 16.

The object function 38 is general and may, for example, be the weighted sum of several factors. The most important contributing factor is the difference error between the predicted and measured logs. The difference error from each logging tool may be weighted independently to account for different logging units (e.g. density in grams/cc versus velocity in ft/sec), the relative importance of the log, and the quality and noise levels in the logs.

Constraint information 38c about the formation model 30 may also be incorporated as input to the constrained optimization 38a. It is included in order to favor formation estimates with desired properties. One constraint is boundedness, for example, the density and acoustic velocity are known to be positive. Another constraint is a statistical relationship between properties, for example, a specified statistical correlation between acoustic velocity and density. Other formation model constraints such as smoothness may be invoked using "regularization" terms, see, e.g. A. N. Tikhonov and V. Y. Arsenin, Solutions of ill-Posed Problems, New York, Wiley, 1977.

In more detail, the formation description 30 of FIG. 3 depends on a set of numerical parameters g which represent the geometry (e.g. bed boundary positions), and parameters $p_l$ which represent the formation log properties, such as the density, resistivity and acoustic velocity within each bed. The formation description 30 is denoted as $F_l(x, g, p_l)$, where $F_l$ is the set of formation log properties at the spatial point x, which depends on the geometry parameters g and log property parameters $p_l$. Note that the properties are not required to be constant-valued in each geometrical region; for example, there may be a ramp in property value within a bed.

Figure 1A:
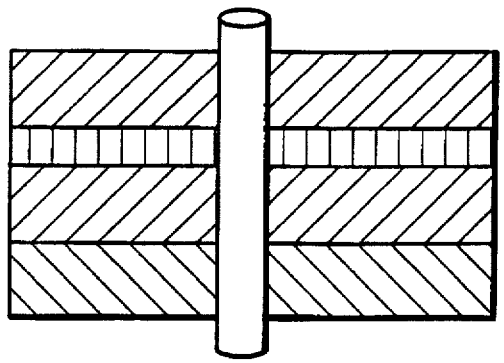
FIGS. 1A-1C is a vertical sectional view of a collection of geometrical models of the subsurface formation showing an increasing order of geometric complexity.
Figure 1B:
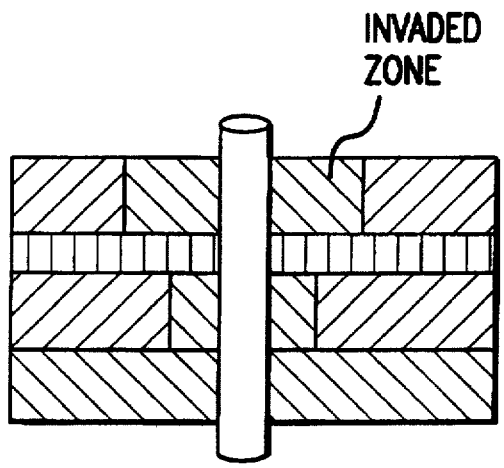
Figure 1C:
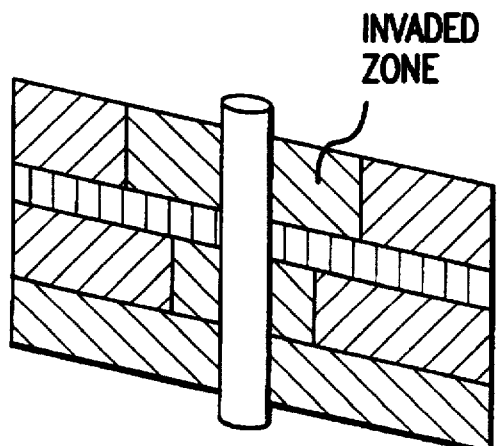
Figure 2:
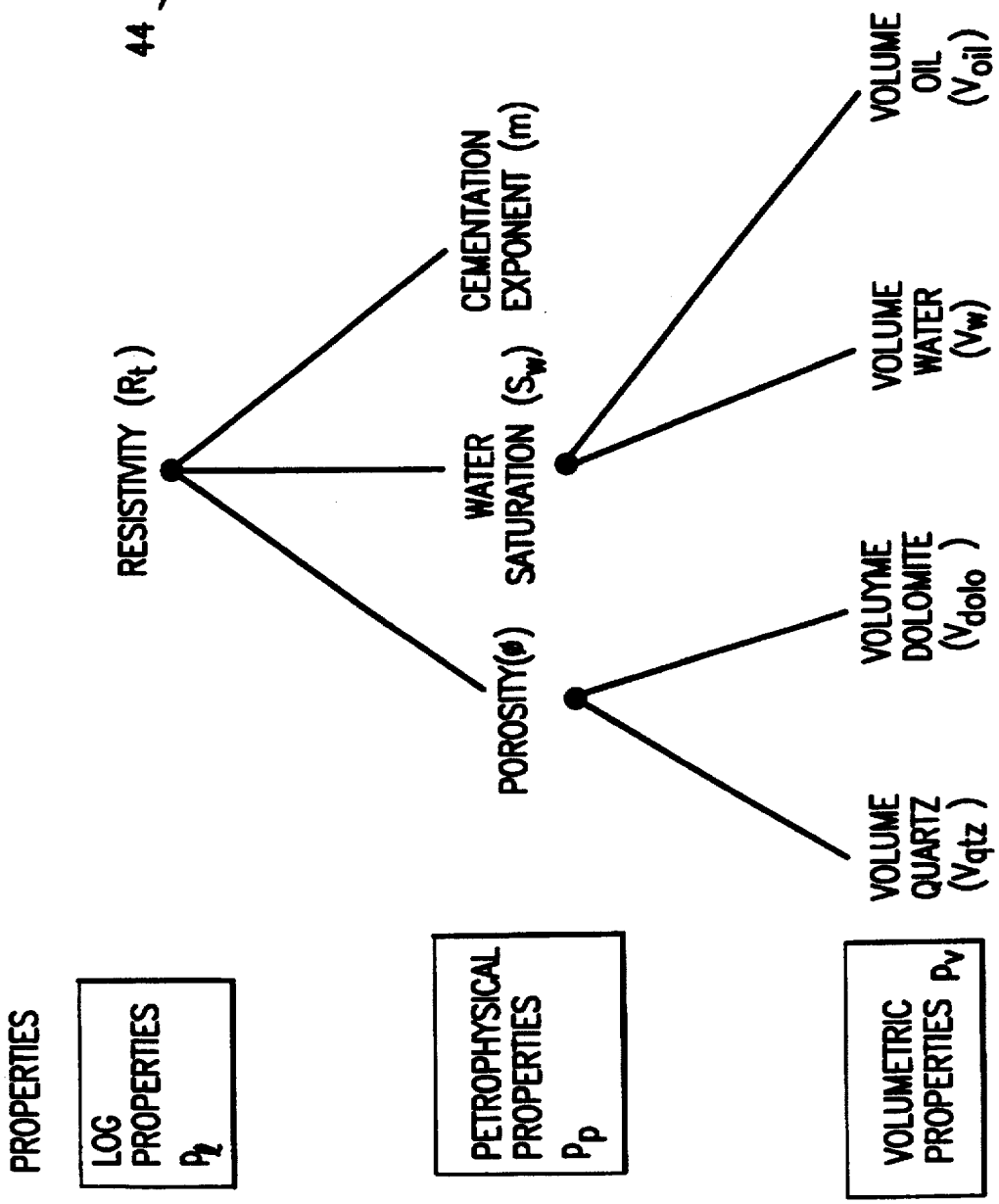
FIG. 2 is a chart displaying the tree structure of formation property models for an individual subsurface layer, showing log properties, petrophysical properties and volumetric properties.
Figure 4:
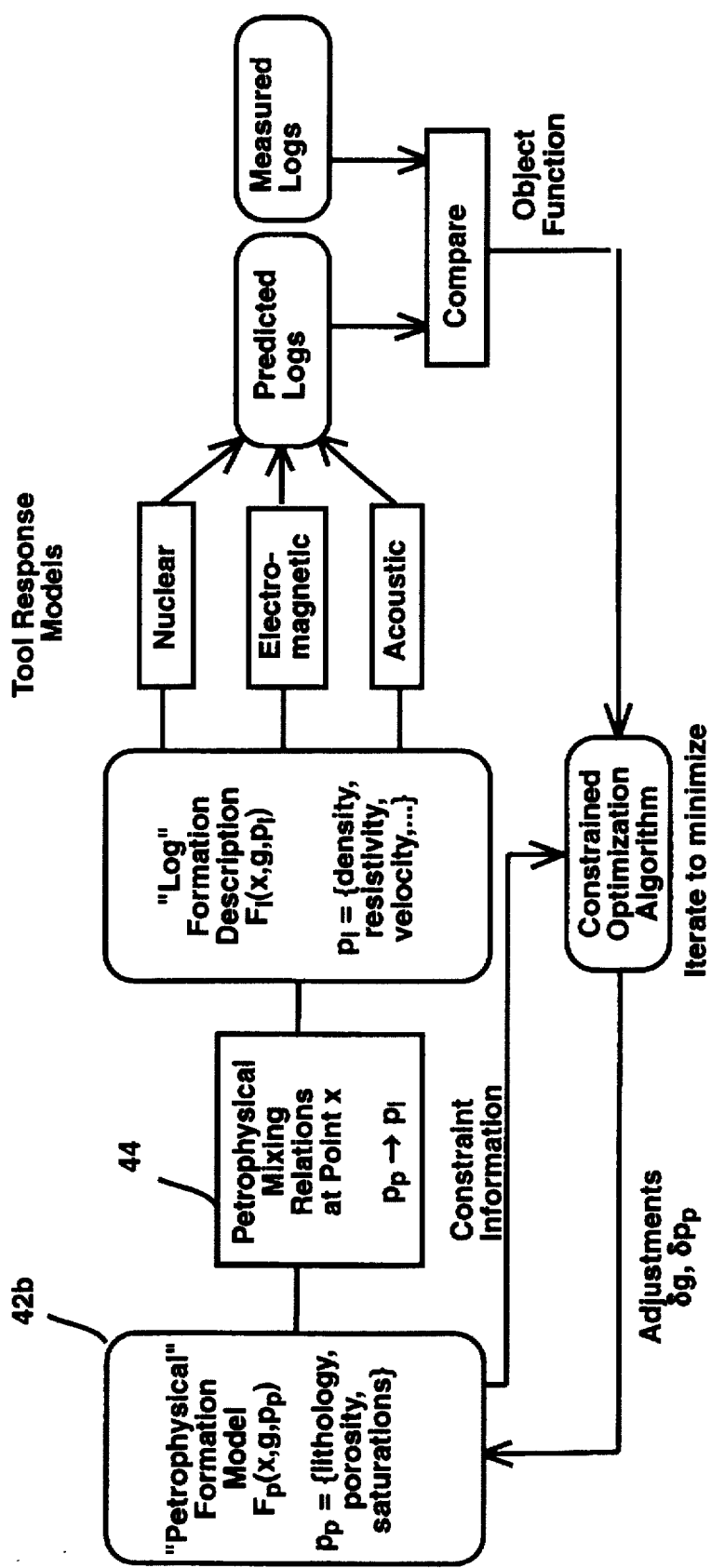
FIG. 4 is a block diagram illustrating the method of the present invention with the formation properties given in terms of "petrophysical" parameters.
Figure 5:
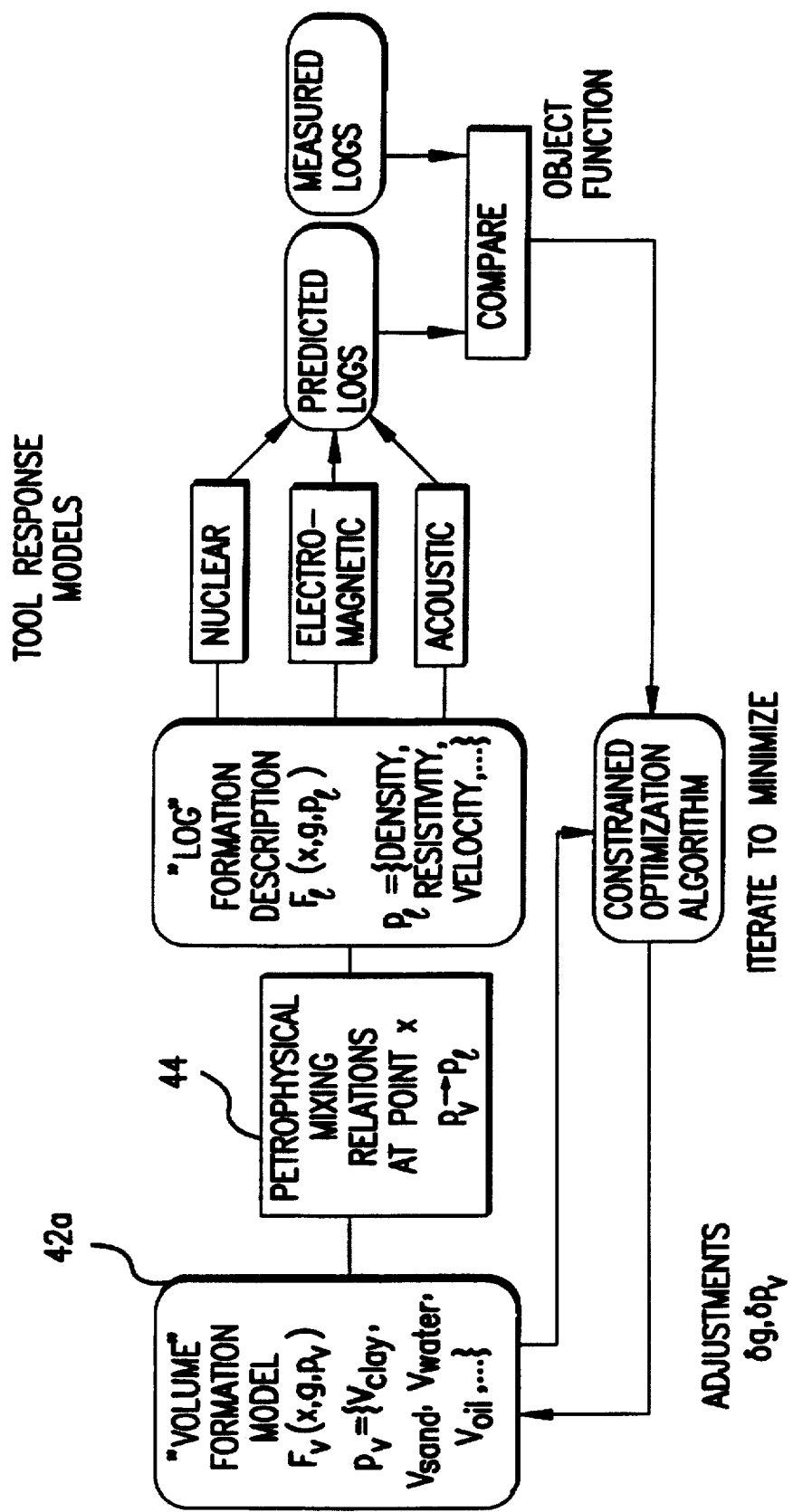
FIG. 5 is a block diagram illustrating the method of the present invention with the formation properties given in terms of "volumetric" parameters.

$F_l(x, g, p_l)$, the formation description 30 of FIG. 3, is based on formation log properties $p_l$, but may be expressed in terms of alternative properties as shown in FIG. 2. One alternative is $F_p(x, g, p_p)$, the formation description 42b of FIG. 4, which is based on formation petrophysical properties $p_p$, such as porosity, fluid saturations and lithology. Another form is $F_v(x, g, p_v)$, the formation description 42a of FIG. 5, which is based on formation volumetric parameters $p_v$, such as volume clay, volume quartz, etc.

As shown in FIG. 2, the formation property parameters $p_l$, $p_p$ and $p_v$ in these representations are related to one another through statistical or deterministic petrophysical mixing relations 44, which may be considered as an additional nonlinear forward model. One example of such a nonlinear relation is the Archie saturation equation describing the electrical resistivity of a water-saturated clean sandstone:

$$R_t = \frac{1}{\phi^m} \frac{R_w}{S_w}$$

where $R_t$ is the rock resistivity, $\phi$ is the porosity, m is the cementation exponent, $R_w$, is the resistivity of the pore-filling brine water, and $s_w$ is the water saturation. The Archie relation is typical of many petrophysical mixing relations, which include additional auxiliary variables, such as coefficients, exponents, and connate water properties. These variables are sometimes assumed to be known a priori, but may also be considered as unknown variables which are estimated during the inversion procedure. Some of these petrophysical auxiliary variables may be constant within a geological zone containing many beds, and external constraint information such as FMS and FMI imagery may be used to divide the formation into zones of constant values for these variables.

A particular benefit to the method of FIG. 3 is the ability to characterize the stability, robustness, and quality of the resulting formation description. That is, known statistical techniques can be applied to evaluate the sensitivity of the method to measurement noise. For example, if the predicted nuclear log is changed 5% in a particular bed, the corresponding change in the estimated formation description 30 in FIG. 3 can be assessed. The availability of the tool response models 32 permits a mechanism for propagating such measurement noise to evaluate the impact on the estimated formation description. Using this method with the system of FIG. 3, the contribution of each measurement to the overall formation description may be assessed, which can lead to the development of a logic or methodology for deciding when and how to include diverse measurements in a given interpretation. For example, if the set of measured logs 24 does not include an acoustic log, but analysis using the tool response models 32 predicts that the presence of an acoustic log would contribute significantly to the quality of the formation description 30, then the acquisition of an acoustic log might be called for, particularly for future wells in the same field.

While logging tools have been discussed in general as a method of predicting a petrophysical formation description (see FIG. 7), it is understood that other types of tools and forward models may be similarly integrated using this approach. For example, fluid pressure and fluid flow measurements such as those available from well testing tools may be incorporated into the method of FIG. 3. With the use of well testing tools, the formation description can be extended from the lithology-porosity-saturation formation description generally used in formation evaluation to a permeability formation description. Measurement while drilling (MWD) and logging while drilling (LWD) tools which acquire data during the drilling process can be incorporated into the method of FIG. 3, as well as point measurements such as those obtained from core samples. Deep reading measurements such as seismic, gravity and electromagnetic (single-well, cross-well, well-surface and surface-surface) could be incorporated into the method of FIG. 3. As used herein, "tool" may incorporate logging tools, well test tools, core sample measurements, LWD/MWD and deep reading measurements.

II. Computational Efficiency in Layered Formations

An important application of petrophysical evaluation using tool response models is in a layered formation. Here, the problem is one of locating bed boundary positions and determining the petrophysical properties within each layer. In the case where the tool response models 32 in FIG. 3 are linear, this problem may be solved in a computationally efficient way.

The initial or starting formation description 30 is an initial estimate of bed boundary positions, obtained for example, from the inflection points of the measured logs 24.

Given M logs, the following three-step algorithm is used:

S0: Initialize the number of beds: $N=N_0$, and their positions: $z_{k,i}, 1 \leq k \leq N-1, 1 \leq i \leq M$, and fix $z_{0,i}$ to the depth of the beginning of the zone and $z_{N,i}$ to the depth at the end of the zone. Also initialize measured property values within each bed: $\mu_{k,i}$ which is the value of property $p_i(z)$ for $z_{k-1,i} \leq z < z_{k,i}$.

S1: Optimize bed boundary positions, $z_{k,i}, 1 \leq k \leq N-1$ and property values $\mu_{k,i}, 1 \leq k \leq N-1$ so that the object function (depending on the fit error between the measured and the predicted logs) is minimum.

S2: If the overall fit is acceptable STOP, otherwise introduce one more bed boundary at the depth where the error is the largest and GO TO S1.

The optimization step, S1, is preferably a constrained optimization to minimize an object function given by a weighted fit error as follows:

$$\min_{z_i, \mu_i} \sum_{i=1}^{M} \omega_i \|l_i - \hat{l}_i\|^2$$

where $z_i$ and $\mu_i$ are sets of variables for the bed boundary positions and log property values for the $i^{th}$ log. The predicted $i^{th}$ log $\hat{l}_i$ is computed by using the following 1-D linear measurement model:

$$\hat{l}_i = g_i * p_i \quad (1)$$

where $g_i$ is the one-dimensional linearized tool response model for the $i^{th}$ tool, * denotes convolution operation and $p_i$ is the layered property model defined as:

$$p_i(z) = \mu_{k,i}, \text{ for } z_{k-1,i} \leq z < z_{k,i} \quad (2)$$

The minimization of this object function with respect to the layer positions and the property values is performed in two steps: first choose the layer positions $z_{k,i}$ and then find optimum property values $\mu_{k,i}$ within these layers. Given the layer positions $z_{k,i}$, the predicted logs are linear functions of the layer properties $\mu_{k,i}$, so the optimum layer properties $\mu_{k,i}$ can be directly and noniteratively identified by solving an appropriate system of linear equations. Therefore, the only variables in this optimization problem which must be estimated iteratively are the layer positions. For linear tool response models, then, the above algorithm may be rewritten as follows:

S0: Initialize number of beds: $N=N_0$ and their positions: $z_{k,i}, 1 \leq k \leq N-1, 1 \leq i \leq M$, and fix $z_{0,i}$ to the depth at the beginning of the zone and $z_{N,i}$ to the depth at the end of the zone.

S1: Optimize bed boundary positions, $z_{k,i}, 1 \leq k \leq N-1$ so that the following fit error between the measured and the predicted logs is minimized:

$$\min_{z_i} \sum_{i=1}^{M} \omega_i \|l_i - \hat{l}_i\|^2$$

where the predicted $i^{th}$ log $\hat{l}_i$ is computed by using the 1-D linear measurement model in equation (1) and $p_i$ is the layered property model in equation (2), where the $\mu_{k,i}$ are set equal to the optimum layer property values given the layer boundary positions.

S2: If the overall fit is acceptable STOP, otherwise introduce one more bed boundary at a depth where the error is the largest and GO TO S1.

Preferably the bed boundaries are constrained, otherwise the above process may produce different layered formation models for each measured log property. The following set of constraints are used, but not necessarily all used at the same time.

1. Minimum allowed bed thickness of $T_{min}$:

$$z_{k,i} - z_{k-1,i} \geq T_{min}, \text{ for } 1 \leq k \leq N, 1 \leq i \leq M$$

2. No allowed depth shift across the measurements:

$$z_{k,i} - z_{k,j} = 0, \text{ for } 1 \leq k \leq N, 1 \leq i,j \leq M$$

3. Static depth shift across the measurements relative to the first measurement:

$$z_{k,i} - z_{k,1} = \Delta z_i, \text{ for } 1 \leq k \leq N, 2 \leq i \leq M$$

with a maximum allowed static depth shift of $\Delta z_{max}$ which is greater than or equal to $\Delta z_i$.

4. Dynamic depth shift across the measurements:

$$|z_{k,i} - z_{k,j}| \leq \Delta z_{max}, \text{ for } 1 \leq k \leq N, 1 \leq i,j \leq M$$

where $\Delta z_{max}$ is the maximum allowed dynamic depth shift at each layer boundary.

Appendix A contains MATLAB computer routines which implement the above algorithm and handle different sets of constraints. The main routine is called "beds". A flowchart for "beds" is included in Appendix A, as well as a list of the important variables in "beds". The "beds" program calls the built-in MATLAB constrained optimization routine called "constr". It also calls several functions which are included in Appendix A, such as:

"fcc", which computes the object function

"gcc", which computes the gradients of the object function

"fmu", which computes the optimal bed properties given the boundary positions

"fmcontr", which computes the predicted log by convolution

"fraugment", which combines two matrices into one matrix.

The "beds" routine and its associated functions include the following functionalities:

Multiple measurements of different properties with different sampling rates can be used for bed boundary identification. The various measurements and their sample positions are loaded in at the beginning of the "beds" routine.

Each measurement covers approximately the same zone, in order that the "beds" routine can effectively combine information from multiple logs traversing a common section of the formation. The common depth interval endpoints are stored in S(1) and S(2) in the "beds" routine.

Each measurement is treated as discrete samples of an underlying continuous signal which is found by third order polynomial interpolation between any two samples. This is achieved in the "fcc", "gcc" and "fmu" functions by computing a weighted combination of multiple predicted logs computed by repeat calls to the "fmcontr" function.

Linear 1-D vertical tool response functions are used in generating predicted logs. The convolution of the property variation along the well with the tool response function is performed in the "fmcontr" function.

User specifies the minimum bed thickness Tmin in the final description. This value is used at the end of the "beds" routine to insure that new bed boundaries are only introduced into beds thicker than 2Tmin. It is also used as an explicit constraint on the bed thickness at the end of the "fcc" function, where S(3)=Tmin.

Main routine calls a constrained iterative nonlinear optimization package for solution of optimal positions for a given number of beds. The nonlinear optimization program is "constr" and is called by the "beds" program.

Constrained optimization package has access to the function "fcc" which computes the weighted fit error and its partial derivatives with respect to bed boundary positions.

Constrained optimization package has access to the function "gcc" which computes the constraints and their partial derivatives with respect to the bed boundary positions.

A function called "fmcontr" exists for predicting the log in a layered formation by convolving the formation property with the tool response model.

A quantitative relative importance of each bed in a layered description is computed near the end of the "beds" routine to provide an indication of the significance of each bed boundary.

Additional Matlab routines to perform computations similar to those in the "beds" routine are possible. Such routines include the additional capability to estimate static depth shifts between different logs, and to estimate minor perturbations of the sample positions (so-called depth matching problem) to compensate for imperfect sampling alignment due to cable stretch and erratic tool movement in the borehole.

The approach implemented in the "beds" Matlab routine has been validated on real logs obtained by running the Schlumberger Maxis Express tool in a man-made formation consisting of a stack of rock layers, in which case the true rock layer boundary positions and layer properties are known. Three measurement channels were chosen for analysis: the first energy window count rates of the gamma-gamma back scattering detector, the second energy window count rates of the gamma-gamma short spacing detector, and the high-resolution resistivity measurement.

Figure 8A:
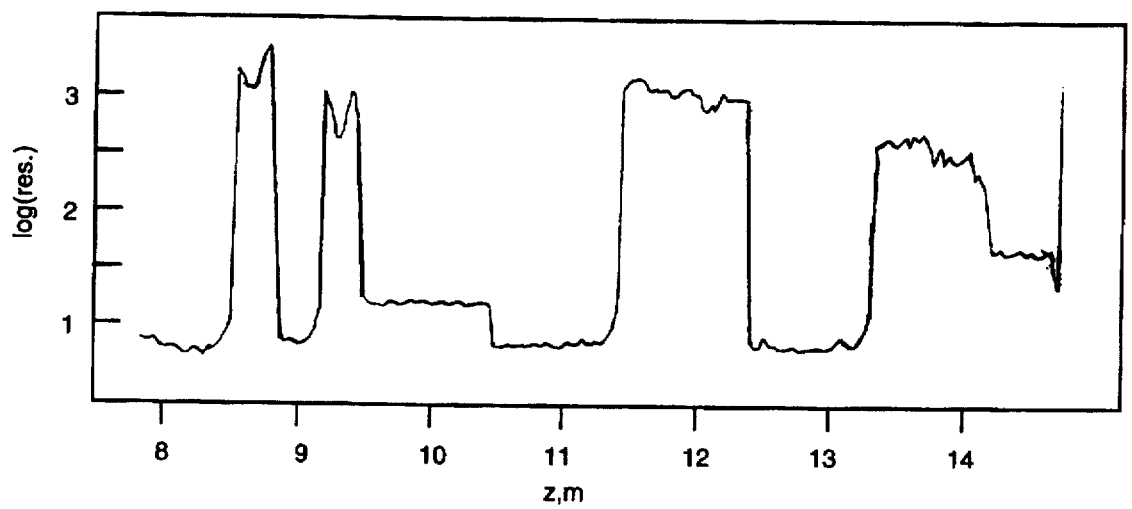
FIGS. 8(A)-8(C) are graphs showing actual wireline measurements of a test well.
Figure 9A:
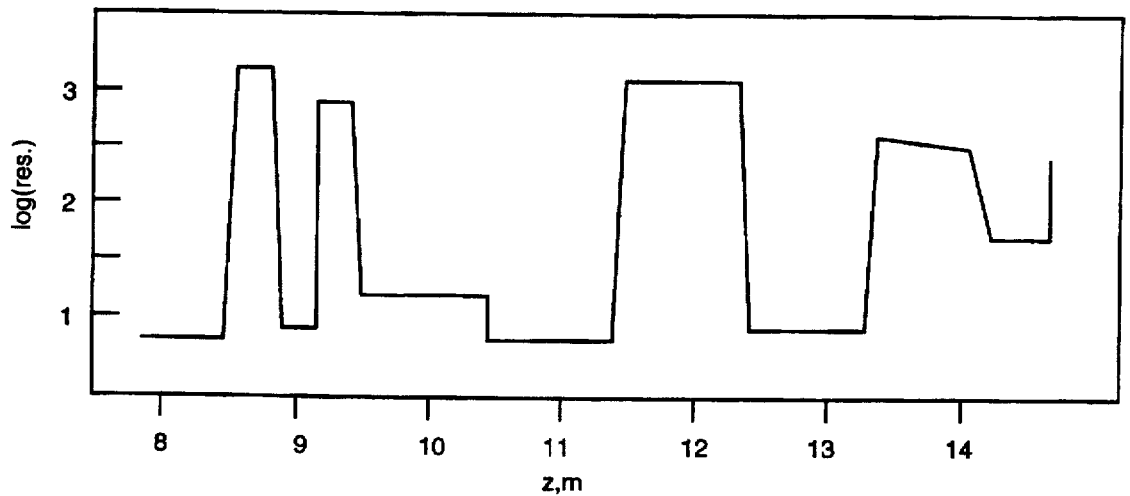
FIGS. 9(A)-9(C) are graphs depicting predicted logs of the test well used in FIGS. 8(A)-8(C)
Figure 8B:
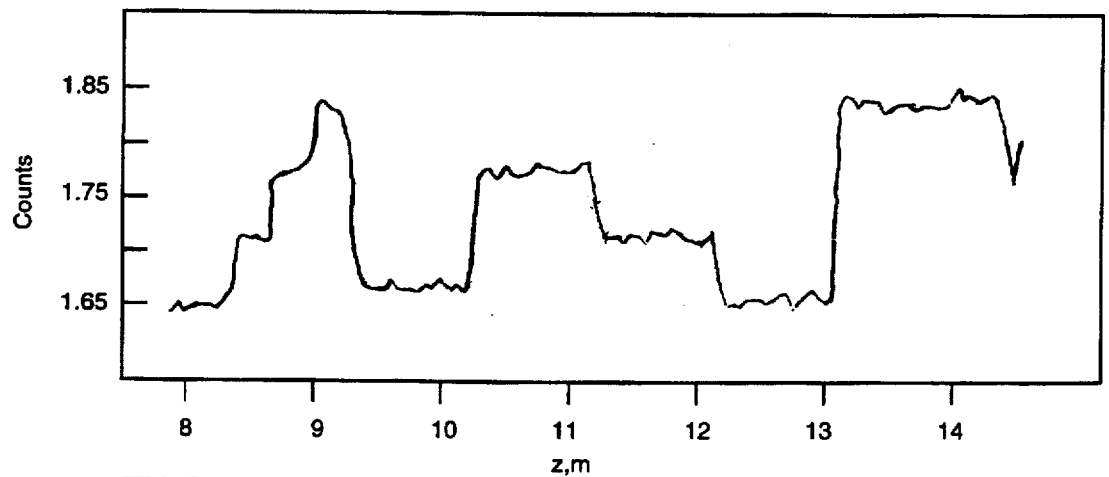
Figure 9B:
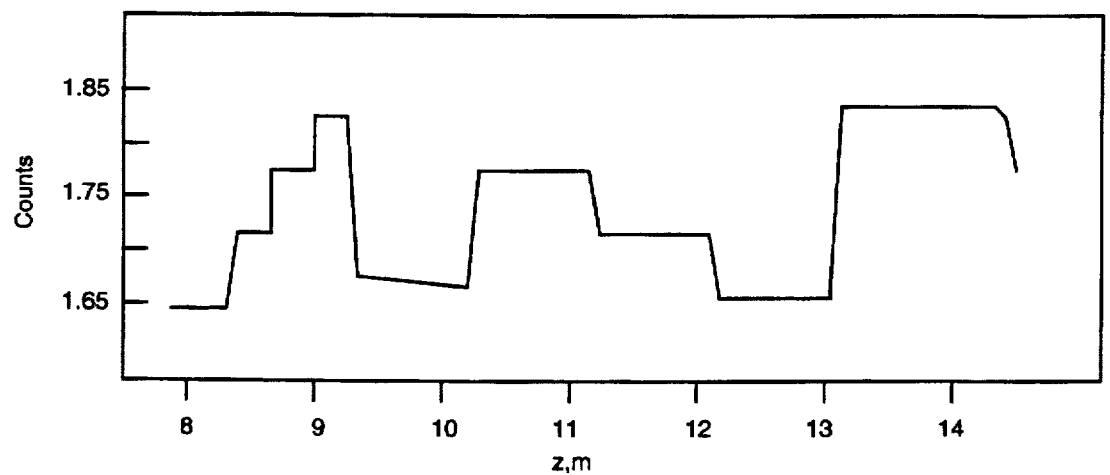
Figure 8C:
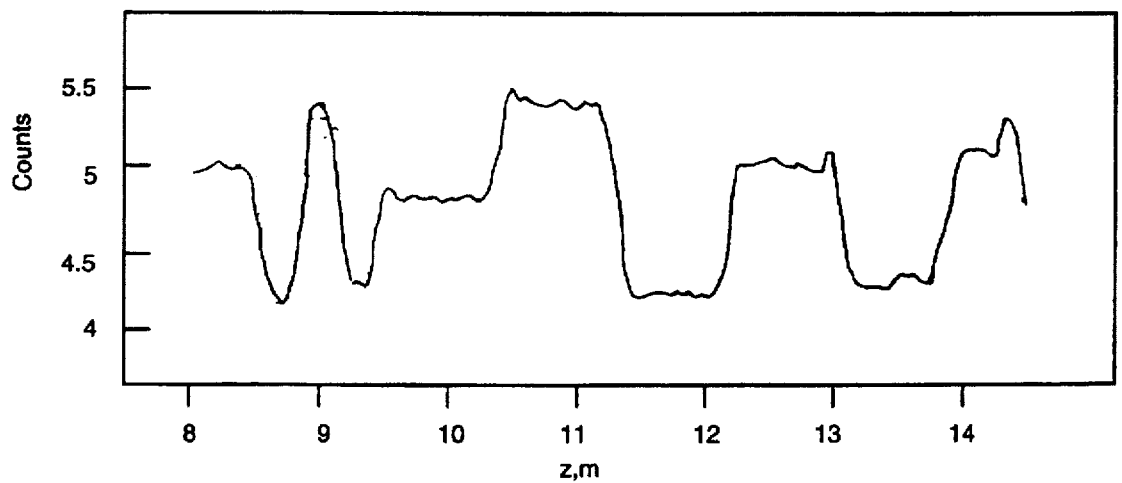
Figure 9C:
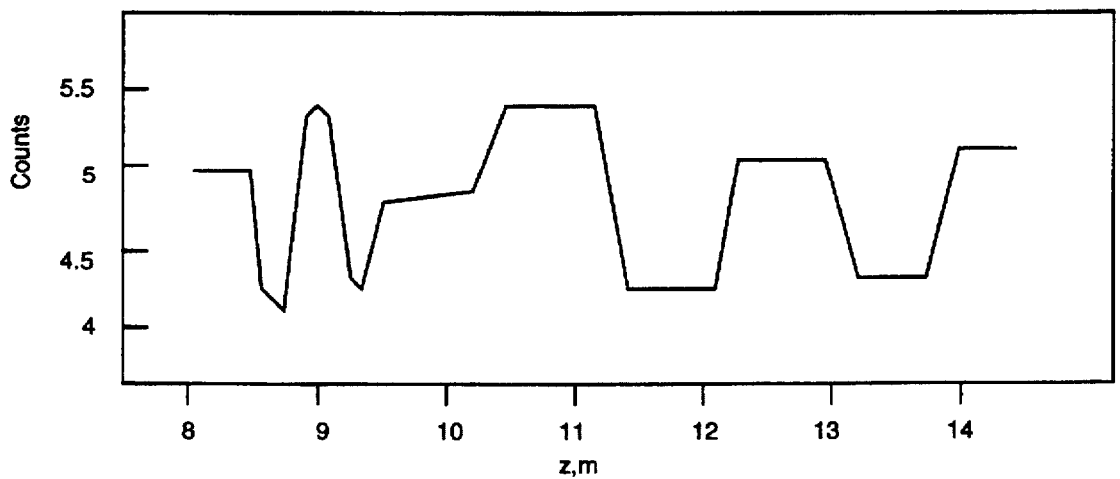
Figure 10:
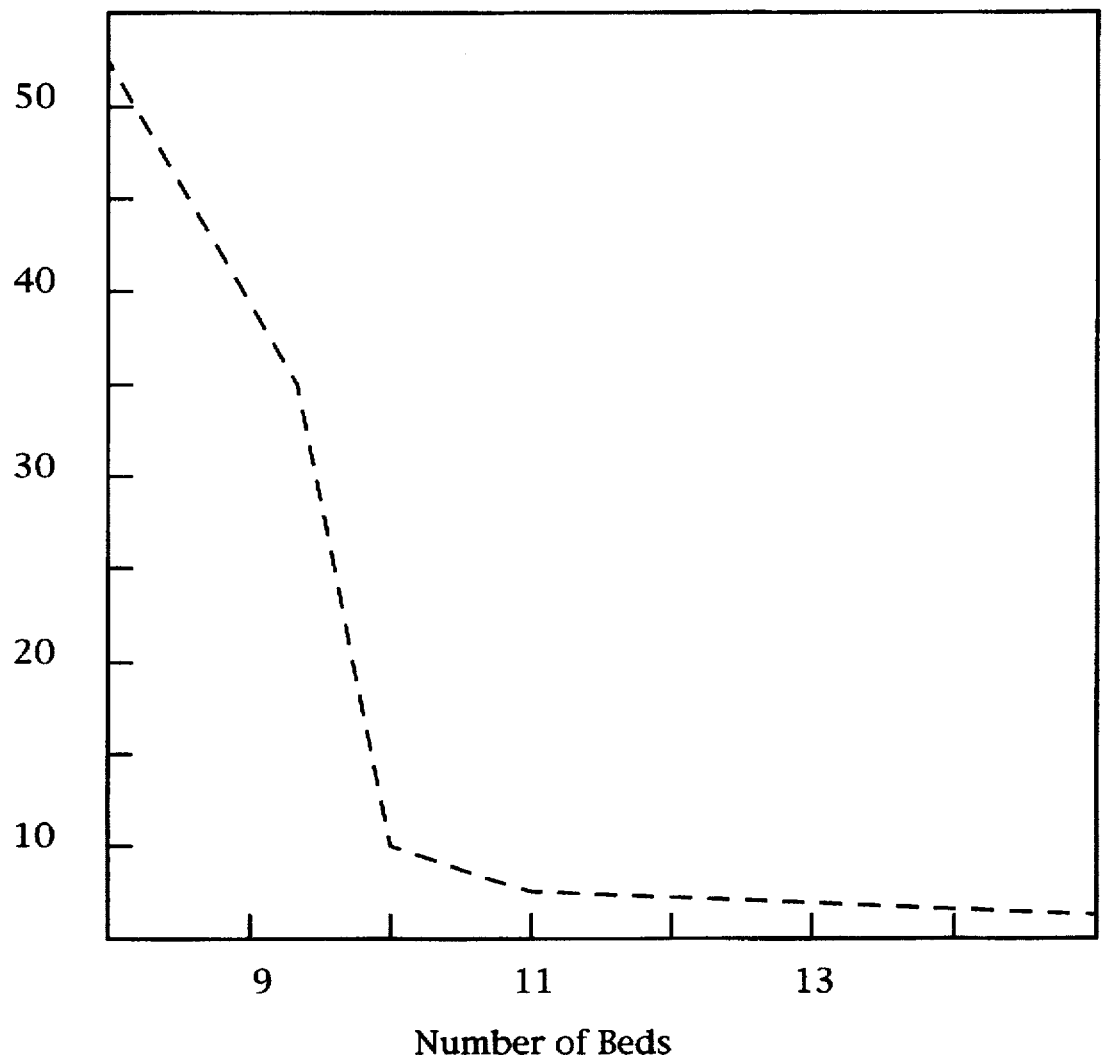
FIG. 10 is a graph showing the total weighted fit error as a function of the number of beds of the test well used in FIGS. 8 and 9.
Figure 11:
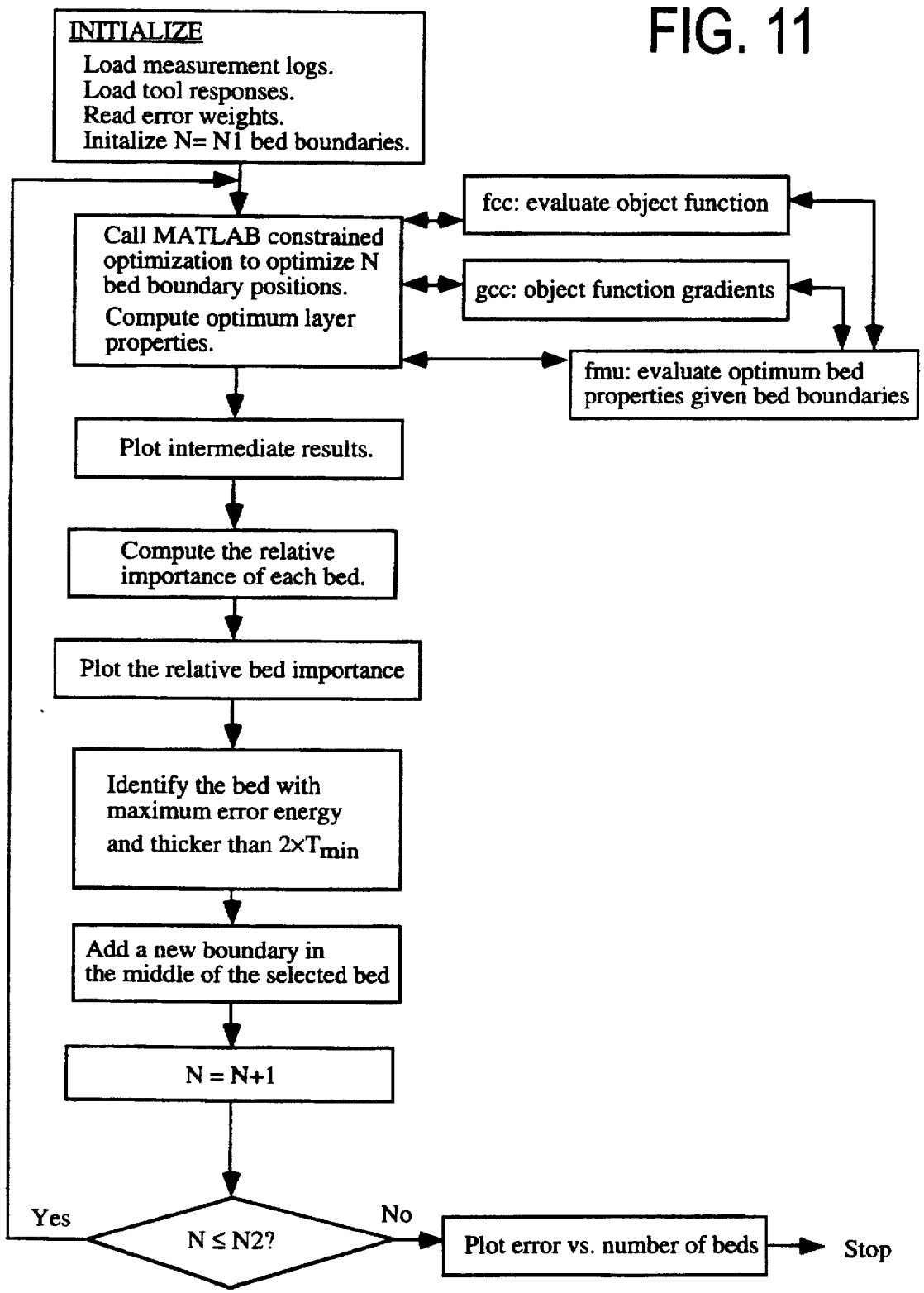
FIG. 11 is a flowchart illustrating a MATLAB routine for optimizing bed boundary positions.

FIGS. 8(A), (B), and (C) show the three measurement channels as a function of depth. In this test case, the bed boundaries were identified using the "beds" routine of Appendix A. The corresponding predicted logs for the measurements of FIGS. 8(A)–(C) are shown in FIGS. 9(A)–(C). As can be seen, there is good agreement between the measurement channels (FIG. 8) and the predicted logs (FIG. 9) for a formation consisting of 11 beds. FIG. 10 depicts the weighted fit error versus the number of modeled beds. As can be seen, the weighted fit error decreases significantly in going from 8 beds to 11 beds, and it then levels off. The following table shows a comparison between actual bed positions and predicted bed positions for a final model with 11 beds.

| Actual Bed Positions | Predicted Bed Positions |
|---|---|
| 8.58 | 8.58 |
| 8.87 | 8.89 |
| 9.19 | 9.19 |
| 9.49 | 9.50 |
| 10.43 | 10.44 |
| 11.35 | 11.33 |
| 12.24 | 12.24 |
| 13.18 | 13.16 |
| 14.00 | 14.01 |
| 14.50 | 14.50 |

Actual and predicted bed boundary positions from the Maxis Express tool logging a man-made formation.

58.0030
Appendix A

Appendix A: MATLAB computer routines to implement bed boundary estimation; the main routine is called "beds".

Description of variables used in BEDS program

| | |
|---|---|
| M | Number of measurements that are used for bed boundary estimation. |
| N1 | Number of beds in the starting description. |
| N2 | Number of beds in the final description. |
| Tmin | Minimum allowed bed thickness. |
| g | Temporary vector that holds forward tool response function. |
| org | Temporary vector that holds information about g, <br> org(1): position of the origin with respect to the first sample in g <br> org(2): length of g. |
| G | Matrix whose columns are g vectors of each measurement. |
| ORG | Matrix whose columns are org vectors of each g. |
| wght | Length M vector whose entries are the user specified weights used in the computation of weighted fit error. |
| loz | Vector of measurement logs loaded into program. |
| z | Depth vector corresponding to loz loaded into program. <br> z is in ascending order, $z(1) < z(2) < ...$ |
| NS | Length M vector that holds the number of samples in each measurement. |
| zmat | Matrix whose columns are the depth vectors for each measurement. |
| lozmat | Matrix whose columns are the measurements. |
| delz | Length M vector whose entries are the sampling interval corresponding to each measurement. |
| outfilenm | User specified string variable that holds the name of output file for the plots generated. |
| iflag | User specified input flag. If it is set to 1, initial bed boundaries are specified by the user and they are loaded into the program from a file. The file contains a vector named x1 whose size is N1-1. |
| x1 | Length N1-1 vector of initial bed boundary positions. |
| S | Vector whose entries are relevant parameters that are used in the optimization. <br> S(1): the beginning of common zone of all measurements. <br> S(2): the end of common zone of all measurements,. <br> S(3): Tmin. <br> S(4:M+3): offset. |
| ct | Length N2-N1 vector whose entries are the optimal cost corresponding to number of beds used in the description, i.e., ct(k) is the minimum weighted fit error corresponding to the optimally chosen layered description with N1+k-1 layers. |
| mumat | NxM Matrix whose columns are the optimal properties for each measurement, i.e., mumat(:,k) is an N vector whose first entry is the layer value for the first bed corresponding to the kth measurement. |
| xopt | Matrix composed of optimal bed positions for each iteration of N. |
| muopt | Matrix composed of optimal property values for each iteration of N. |
| parhat | Matrix composed of optimally chosen layered formation for each measurement and for each iteration of N, i.e., parhat(:,1) is a vector of length NS(1) and it corresponds to the layered formation with N1 beds of the first measured property as a function of depth, zmat(:,1). |
| Nstar | Optimal number of beds chosen by the user, $N1 <= N <= N2$. |
| x_mu | Final answer of the program which is a matrix composed of optimal x, bed boundary positions for the first measurement, and optimal property values with in each bed, muopt(1:Nstar,Nstar-N1+1). |
| prop | Final answer for the measured properties with Nstar beds as a function of depth. |

-1-

```
% program beds.m
%
% MATLAB program for bed boundary identification based on
% multiple linearized 1-D vertical tool response models.
%-----------------------------------------------------------------
%
% INITIALIZATION
%
options(1) = 1; % 1 displays tabular listing
options(2) = 5e-2; % termination criterion for x
options(3) = 1e-2; % termination criterion for f
options(4) = 1e-3; % termination criterion for g
vlb = [];
vub = [];
M = input('Enter number of mesurements, M: ');
N1 = input('Enter initial number of segments, N1: ');
N2 = input('Enter final number of segments, N2: ');
N = N1;  % Initial number of beds
Tmin = .75;

for m = 1:M  % loop over all measurements
    filenm = input(['Enter filename ',num2str(m),' as a string: ']);
    str = ['load ',filenm];
    eval(str)  % load filenm.mat with log loz and depth z.
    str = ['load ',filenm,'_g'];
    eval(str)  % load filenm_g.mat with 1-D tool response g and org.
    g = reshape(g,org(2),1);
    org = reshape(org,1,2);
    wght(m) = input(['Enter weight ',num2str(m),': ']);  % get weights
    NS(m)  = max(size(loz));
    z = reshape(z,NS(m),1);
    delz(m) = z(2)-z(1);
    loz = reshape(loz,NS(m),1);
    if m==1,
        G = g;
        org = reshape(org,1,2);
        ORG = org;
        zmat = reshape(z,NS(m),1);
        lozmat = reshape(loz,NS(m),1);
    else
        G = fraugment(G,g);   % build matrix of tool responses
        ORG = [ORG;org];
        zmat = fraugment(zmat,z);  % build matrix of measure depths
        lozmat = fraugment(lozmat,loz);  % build matrix of measured logs
    end
end
```

-2-

```
wght    = reshape(wght,length(wght),1);
parhat = zeros(size(lozmat));
S(1) = max(zmat(1,:));    % build S vector of depth and boundary parameters
for m = 1:M
    z2v(m)  = zmat(NS(m),m);
end
S(2) = min(z2v);
z_min = min(zmat(1,:));
z_max = max(z2v);
zz = [z_min:(z_max-z_min):z_max];
ll = 0*zz;
S(3) = Tmin;
outfilenm = input(['Enter filename for output plots as a string: ']);
outstr = ['print -dpsc -append ',outfilenm];

iflag = input(['Want to load initial bed boundaries from a file? (1=Y)']);
if iflag == 1    % Initialize bed boundary model
    filenm = input(['Enter filename ',num2str(m),' as a string: ']);
    str = ['load ',filenm];
    eval(str)
else
    % Uniformly spaced initial guess for the partition
    x1 = S(1)+[1:N-1]*(S(2)-S(1))/N;
end
x1 = reshape(x1,N-1,1);
x  = x1;    % x contains the bed boundary depths %
% This loop progressively increases number of beds N from N1 to N2.
%
for N = N1:N2
    options(14)  = 20*(N-1);           % call MATLAB constrained optimization
    [x,options]  = constr('fcc',x, ...
        options,vlb,vub,'gcc',lozmat,zmat,delz,N,M,NS,wght,S,G,ORG);
    ct(N-N1+1)   = options(8);
    mumat = fmu(x, ... % Compute optimum properties given bed boundaries
        lozmat,zmat,delz,N,M,NS,wght,S,G,ORG);
    if N == N1,
        xopt(:,1) = reshape(x,N-1,1);   % xopt is optimum bed boundary positions
        muopt    = reshape(mumat,N,M);
    else                                 % muopt is the optimum bed property values
        xopt = fraugment(xopt,reshape(x,N-1,1));
        muopt = fraugment(muopt,reshape(mumat,N,M));
    end
```

```
%
% The following loop plots intermediate results
%
    for m = 1:M
        figure(m)
        mu = mumat(:,m);
        z = zmat(1:NS(m),m);
        loz = lozmat(1:NS(m),m);
        xs = (x - z(1))/delz(m);
        x1 = fix(xs);
        p1 = ones(x1(1),1)*mu(1);
        for k = 2:N-1
            p1 = [ p1 ; ones(x1(k)-x1(k-1),1)*mu(k)];
        end
        p1 = [ p1 ; ones(NS(m)-x1(N-1),1)*mu(N)];
        r1 = fmcontr(p1,m,G,ORG);
        r = r1;
        for k = 1:N-1
            x2 = x1;
            x2(k) = x1(k)+1;
            p2 = ones(x2(1),1)*mu(1);
            for j = 2:N-1
                p2 = [ p2 ; ones(x2(j)-x2(j-1),1)*mu(j)];
            end
            p2 = [ p2 ; ones(NS(m)-x2(N-1),1)*mu(N)];
            r2 = fmcontr(p2,m,G,ORG);
            delr = (r2-r1)/delz(m);
            r = r + delr*(xs(k)-x1(k))*delz(m);
        end
        r = reshape(r,NS(m),1);
        fiterr = loz-r;
        efterr(1:NS(m),m) = fiterr.*fiterr;
        parh = [];
        xp = round((x-z(1))/delz(m));
        parh = ones(xp(1),1)*mu(1);
        for k = 2:N-1
            temp1 = ones(xp(k)-xp(k-1),1)*mu(k);
            parh = [ parh; temp1];
        end
        parh = [ parh; ones(NS(m)-xp(N-1),1)*mu(N)];
        parhat_tmp(1:NS(m),m) = parh;
        perr(1,m) = sum(efterr(1:x1(1),m));
        perr(N,m) = sum(efterr(x1(N-1):NS(m),m));
        for k = 2:N-1
            perr(k,m) = sum(efterr(x1(k-1)+1:x1(k),m));
        end
```

```
        perrm = sum(abs(perr(:,m)));
%
% Plot intermediate results
%
        subplot(211);plot(zz,ll+mean(loz),'k.',z,loz,'r',z,parh,'g')
        title(['Profile for N= ',num2str(N),', err = ',num2str(perrm)])
        xlabel('z, m')
        subplot(212);plot(zz,ll+mean(loz),'k.',z,loz,'r',z,r,'g')
        title(['Fit for N= ',num2str(N),', err = ',num2str(perrm)])
        xlabel('z, m')
        eval(outstr)
        per = ones(x1(1),1)*(mu(1)-mu(2));
        rper = fmcontr(per,m,G,ORG);
        terre(1,m)=rper'*rper*delz(m);
        for bind = 2:N-1
            delmu = min(abs(mu(bind)-mu(bind+1)),abs(mu(bind)-mu(bind-1)));
            per = ones(x1(bind)-x1(bind-1),1)*delmu;
            rper = fmcontr(per,m,G,ORG);
            terre(bind,m) =rper'*rper*delz(m);
        end
        per = ones(NS(m)-x1(N-1),1)*(mu(N)-mu(N-1));
        rper = fmcontr(per,m,G,ORG);
        terre(N,m)=rper'*rper*delz(m);
    end %
% In the rest of this section refine x with N beds to N+1 beds
% and use it as the starting point of a new optimization with
% N+1 beds.
%

%
% Compute relative importance of each bed.
%
    terrew = terre*wght;
    perr_w = perr*wght;
    perr_w_p = ones(1,x1(1))*perr_w(1);
    for k = 2:N-1
        perr_w_p = [ perr_w_p ones(1,x1(k)-x1(k-1))*perr_w(k)];
    end
    perr_w_p = [ perr_w_p ones(1,NS(m)-x1(N-1))*perr_w(N)];
    trelim_p = ones(1,x1(1))*terrew(1);
    for k = 2:N-1
        trelim_p = [ trelim_p ones(1,x1(k)-x1(k-1))*terrew(k)];
    end
    trelim_p = [ trelim_p ones(1,NS(m)-x1(N-1))*terrew(N)];
```

```
%
% Plot relative importance of beds
%
    figure(M+1)
    subplot(211);semilogy(zz,ll+mean(trelim_p),'k.',z,trelim_p,'g')
    grid
    title(['Total Relative Importance of Beds']);
    xlabel('Bed Positions, m')
    subplot(212);semilogy(zz,ll+mean(perr_w_p),'k.',z,perr_w_p,'g')
    grid
    title(['Total Weighted Error']);
    xlabel('Bed Positions, m')
    eval(outstr)
    if N == N1
        parhat = parhat_tmp;
    else
        parhat = fraugment(parhat,parhat_tmp);
    end %
% The interval with maximum error energy and width larger
% than 2*Tmin is divided into two beds
%
    gcon(1) = S(1)-x(1)+Tmin;
    gcon(N) = x(N-1)-S(2)+Tmin;
    for k = 2:N-1
        gcon(k) = x(k-1)-x(k)+Tmin;
    end
    fact = 1;
    nac = gcon < -fact*Tmin;
    nac = reshape(nac,N,1);
    perr_w = perr*wght;
    tperr_w = perr_w.*nac;
    [mperr,mperri] = max(tperr_w);
    if mperri == 1              % Add new bed boundary
        x = [ (S(1)+x(1))/2; x];
    else if mperri == N
        x = [ x; (S(2)+x(N-1))/2 ];
    else
        x = [ x(1:mperri-1); (x(mperri-1)+x(mperri))/2; x(mperri:N-1)];
    end
end     % End of N loop.
```

```
%
% Plot residual energy vs. number of beds, pick final number of beds
%
subplot(111);
clg
plot([N1:N2],ct,'r')
title('Residual Error Energy')
xlabel('Number of Beds')
eval(outstr)
Nstar = input(['Enter Nstar, order of desired partition: ']);
x = xopt(1:Nstar-1,Nstar-N1+1);
mu = muopt(1:Nstar,Nstar-N1+1);
x_mu = fraugment(x,mu);
prop = parhat(:,(Nstar-N1)*M+1:(Nstar-N1+1)*M);
save beds_result x_mu prop NS
end
```

```
function [f,g] = fcc(x,lozmat,zmat,delz,N,M,NS,wgth,S,G,ORG)
%
%       This function computes the weighted fit error and constraints
%
f = 0;  % start by computing the optimum properties given bed boundaries
mumat  = fmu(x,lozmat,zmat,delz,N,M,NS,wgth,S,G,ORG);

for m = 1:M              % loop over the logs
    mu = mumat(:,m);
    z = zmat(1:NS(m),m);
    loz = lozmat(1:NS(m),m);
    xs = (x - z(1))/delz(m);;
    x1 = fix(xs);
    p1 = ones(x1(1),1)*mu(1);   % build property vector
    for k = 2:N-1
        p1 = [ p1 ; ones(x1(k)-x1(k-1),1)*mu(k)];
    end
    p1 = [ p1 ; ones(NS(m)-x1(N-1),1)*mu(N)];
    r1 = fmcontr(p1,m,G,ORG);  % convolve with tool response
    r = r1;
    for k = 1:N-1
        x2 = x1;
        x2(k) = x1(k)+1;
        p2 = ones(x2(1),1)*mu(1);
        for j = 2:N-1
            p2 = [ p2 ; ones(x2(j)-x2(j-1),1)*mu(j)];
        end
        p2 = [ p2 ; ones(NS(m)-x2(N-1),1)*mu(N)];
        r2 = fmcontr(p2,m,G,ORG);
        delr = (r2-r1)/delz(m);
        r = r + delr*(xs(k)-x1(k))*delz(m);
    end
    r = reshape(r,NS(m),1);
    fiterr = loz-r;
    f = f+norm(fiterr)^2*wgth(m);   % cost is sum of weighted squared fit error
end
%
%       Evaluate the constraints
%
g(1)   = S(1)-x(1)+S(3);      % these g values must be less than or equal to zero
g(N)   = x(N-1)-S(2)+S(3);
for k = 2:N-1
    g(k)   = x(k-1)-x(k)+S(3);
end
```

```
function [df,dg] = gcc(x,lozmat,zmat,delz,N,M,NS,wgth,S,G,ORG)
%
%      This function computes the gradients of the cost and the
%      optimization constraints.
%
df = 0;  % start by computing the optimum properties given bed boundaries
mumat = fmu(x,lozmat,zmat,delz,N,M,NS,wgth,S,G,ORG);

for m = 1:M             % loop over the logs
    delr = [];
    mu = mumat(:,m);
    z = zmat(1:NS(m),m);
    loz = lozmat(1:NS(m),m);
    xs = (x - z(1))/delz(m);;
    x1 = fix(xs);
    p1 = ones(x1(1),1)*mu(1);   % build property vector
    for k = 2:N-1
        p1 = [ p1 ; ones(x1(k)-x1(k-1),1)*mu(k)];
    end
    p1 = [ p1 ; ones(NS(m)-x1(N-1),1)*mu(N)];
    r1 = fmcontr(p1,m,G,ORG);   % convolve with tool response
    r = r1;
    for k = 1:N-1
        x2 = x1;
        x2(k) = x1(k)+1;
        p2 = ones(x2(1),1)*mu(1);
        for j = 2:N-1
            p2 = [ p2 ; ones(x2(j)-x2(j-1),1)*mu(j)];
        end
        p2 = [ p2 ; ones(NS(m)-x2(N-1),1)*mu(N)];
        r2 = fmcontr(p2,m,G,ORG);
        delr(:,k) = (r2-r1)/delz(m);
        r = r + delr(:,k)*(xs(k)-x1(k))*delz(m);
    end
    r = reshape(r,NS(m),1);
    fiterr = loz-r;
    df = df - 2*wgth(m)*delr'*fiterr;   % evaluate gradient of the cost as the sum of
                                        % derivatives of weighted squared fit error
end
%
%      Evaluate gradient of the constraints
%
c = [ -1 zeros(1,N-2)];    % the columns of dg contain partial derivatives of
r = [ -1  1 zeros(1,N-2)]; % each of the constraints
```

```
dg = toeplitz(c,r);
function mumat = fmu(x,lozmat,zmat,delz,N,M,NS,wgth,S,G,ORG)
%
%       This function computes the optimal bed properties
%       given the bed boundary positions.
% for m = 1:M              % loop over the logs, building h matrix
    h = [];
    z = zmat(1:NS(m),m);
    loz = lozmat(1:NS(m),m);
    xs = (x - z(1))/delz(m);
    x1 = fix(xs);
    p1 = [ ones(x1(1),1);zeros(NS(m)-x1(1),1)];
    r1 = fmcontr(p1,m,G,ORG);
    p2 = [ ones(x1(1)+1,1);zeros(NS(m)-x1(1)-1,1)];
    r2 = fmcontr(p2,m,G,ORG);
    h(:,1) = r1*(x1(1)+1-xs(1))+r2*(xs(1)-x1(1));
                % compute normalized response of layer 1
    for k = 2:N-1
        p1 = [ zeros(x1(k-1),1);ones(x1(k)-x1(k-1),1);zeros(NS(m)-x1(k),1)];
        r1 = fmcontr(p1,m,G,ORG);
        p2 = [zeros(x1(k-1)+1,1);ones(x1(k)-x1(k-1)-1,1);zeros(NS(m)-x1(k),1)];
        r2 = fmcontr(p2,m,G,ORG);
        p3 = [zeros(x1(k-1),1);ones(x1(k)-x1(k-1)+1,1);zeros(NS(m)-x1(k)-1,1)];
        r3 = fmcontr(p3,m,G,ORG);
        h(:,k) = r1 + (r2-r1)*(xs(k-1)-x1(k-1)) + (r3-r1)*(xs(k)-x1(k));
                % compute normalized response of layer k
    end
    p1 = [ zeros(x1(N-1),1);ones(NS(m)-x1(N-1),1)];
    r1 = fmcontr(p1,m,G,ORG);
    p2 = [ zeros(x1(N-1)+1,1);ones(NS(m)-x1(N-1)-1,1)];
    r2 = fmcontr(p2,m,G,ORG);
    h(:,N) = r1*(x1(N-1)+1-xs(N-1))+r2*(xs(N-1)-x1(N-1));
                % compute normalized response of layer N
    mumat(:,m) = h\loz;    % invert h matrix to find optimal properties
end
```

```
function f = fmcontr(p,m,G,ORG)
%
%       This function computes the predicted log,
%              G(:,m) = vertical tool response function
%              p  = property distribution
%
org = ORG(m,1);
lg = ORG(m,2);
g = G(1:lg,m);          % extract convolutional tool response
lp = length(p);
p = reshape(p,lp,1);    % form the log property vector
pap = [ones(lg-org+1,1)*p(1);p;ones(org,1)*p(lp)];
ctr = conv(g,pap);      % covolve the property and tool response
f = ctr(lg+1:lp+lg);    % extract central portion
```

```
function a = fraugment(a,b);
%
%       This function has two input matrices a and b
%       It right augments a with b, i.e., it appends b to the right side of a
%

[ra,ca] = size(a);
[rb,cb] = size(b);
if ra < rb
      a = [ a ; zeros(rb-ra,ca)];       % zero pad before appending
elseif rb < ra
      b = [ b ; zeros(ra-rb,cb)];       % zero pad before appending
end
a = [a b];      % append b to the right side of a
```

We claim:

1. A method of estimating a formation description of a geological formation using a plurality of measurement logs obtained from a plurality of tools traversing an oilwell borehole, comprising the steps of:

(i) building a response model for one or more of said tools where each response model predicts a measurement log based on a formation description;

(ii) inputting a formation description to each response model;

(iii) outputting a predicted log from each response model based on said formation description;

(iv) comparing said predicted logs with said measurement logs and determining a difference error between said logs;

(v) repeating said steps (ii)-(iv) with a second formation description; and (vi) comparing the first difference error associated with the first formation description with the second difference error associated with the second formation description and using the formation description associated with the least difference error as an estimate of said geological formation.

2. The method of claim 1, including the step of iteratively repeating steps (ii)-(vi) to minimize the difference error.

3. The method of claim 1, including the step of iteratively repeating steps (ii)-(vi) until the difference error is less than a predetermined amount.

4. The method of claim 1, including the step of iteratively repeating steps (ii)-(vi) where the formation description is also constrained to satisfy certain conditions.

5. The method of claim 1, including the step of incorporating fine-resolution information about bed boundaries (core, borehole wall images) into said measured logs.

6. The method of claim 1, including the step of propagating measurement noise into one or more tool response models and determining the sensitivity of the formation description to measurement noise.

7. The method of claim 1, including the step of determining the contribution of each tool response model to the formation description.

8. The method of claim 1, including the steps of: adding another tool response model to the building step (i) where said added tool response model does not correspond to a measurement log which has yet been acquired; and, determining the degree to which the formation description quality is improved by including said other tool response model.

9. The method of claim 1, including the step of traversing the oilwell borehole with a plurality of logging tools to obtain measurement logs of said formation surrounding said borehole.

10. The method of claim 1, including the steps of:

(vii) building a model of the petrophysical mixing relations of the materials comprising the formation;

(viii) inputting petrophysical properties of the formation into said petrophysical mixing relations;

(ix) outputting the log properties of the formation from said mixing relations; and (x) inputting said log properties as part of the formation description in step (ii).

11. The method of claim 1, including the steps of:

(vii) building a model of the petrophysical mixing relations of the materials comprising the formation;

(viii) inputting a volume composition of the formation materials into said petrophysical mixing relations;

(ix) outputting the log properties of the formation from said mixing relations; and (x) inputting said log properties as part of the formation description in step (ii).

12. The method of claim 1, including the step of incorporating fine-resolution information about bed boundaries (core, borehole wall images) into said formation description.

13. The method of claim 1, where additional depth shift variables are added to the said formation description and are estimated in order to register or depth align logs from multiple tools.

14. The method of claim 1, where the formation description includes one or more dynamic fluid flow properties such as permeability which are measured with a formation testing tool.

15. The method of claim 1 further comprising:

the first and second formation descriptions having multi-dimensional geometrical description components.

16. The method of claim 1, wherein step (iv) further comprises:

combining the difference error with constraint information, the constraint information based on the first formation description, to determine a constrained optimization algorithm;

using the constrained optimization algorithm to determine an adjustment;

applying the adjustment to the first formation description to determine the second formation description.

17. The method of claim 1, where the formation consists of a number of zones and the formation description comprises two sets of parameters: one set representing the geometry of the zone boundaries, and another set representing the formation property variations within each zone, both sets of parameters being adjusted to obtain a second formation description.

18. The method of claim 17, including the step of iteratively repeating steps (ii)-(vi) to minimize the difference error.

19. The method of claim 17, including the step of iteratively repeating steps (ii)-(vi) until the difference error is less than a predetermined mount.

20. The method of claim 17, including the step of iteratively repeating steps (ii)-(vi) where the formation description is constrained to satisfy certain conditions.

21. The method of claim 17, where the formation consists of a stack of homogeneous horizontal layers and the tool response models are one-dimensional linear models, comprising the additional steps of, estimating the layer boundary positions in the formation description iteratively, solving a linear set of equations using said layer boundary positions to determine layer properties.

22. The method of claim 17, including the step of inputting additional zone boundaries to the formation description to reduce the log difference error.

23. A method of estimating the position of beds in a layered geological formation using a plurality of wireline measurement logs obtained from a plurality of wireline tools, comprising the steps of:

building a response model for each of said wireline tools, where said response model predicts a wireline measurement log based on a description of bed boundary positions in the formation;

inputting a common description of bed boundary positions to each response model;

outputting a predicted log from each of said response models based on said common description of bed boundary positions;

comparing said predicted logs with said measurement logs and determining a difference error between said logs; and inputting another common bed boundary description and repeating said outputting and comparing steps for said other common bed boundary description.

24. A geological formation interpretation system comprising a specially programmed computer having:

memory means for storing a plurality of actual measurement logs of a geological formation;

memory means for storing one or more tool response models where each response model predicts a measurement log based on a formation description;

means for inputting a first formation description and a second formation description;

processor means for generating a first predicted log based on the first input formation description and said tool response model, for comparing the first predicted log with a corresponding actual measurement log, for generating a first difference error from the comparison of the first predicted log and the actual measurement log, for generating a second predicted log based on the second input formation description and said tool response model, for comparing the second predicted log with a corresponding actual measurement log, for generating a second difference error from the comparison of the second predicted log and the actual measurement log, for determining a lesser of the first error difference and the second error difference; and display means for communicating the formation description which yielded the lesser error difference.

25. A method of estimating the geometry and properties in a zoned geological formation using one or more measurement logs obtained from one or more tools traversing an oilwell borehole having a number of depth intervals, comprising the steps of:

building a formation description of homogeneous horizontal layers;

inputting said formation description for a plurality of depth intervals to a set of linear response models for said tools, where said response model predicts a measurement log based on a description of bed boundary positions in the formation;

comparing an output predicted log with said measurement log and determining a difference error between said logs;

repeatedly adjusting said formation description to minimize said difference error;

for one or more depth intervals, adjusting respective formation descriptions by introducing radial zone boundaries corresponding to the positions of fluid fronts in invaded zones;

repeatedly adjusting the invaded zone boundaries to minimize said difference error; for one or more depth intervals, adjusting respective formation descriptions by evidence of formation dip or inclination based on dip measuring tools.

26. The method of claim 25, where at least one of said formations description comprises the position of beds in the formation.

* * * * *